United States Patent
Onaka

(10) Patent No.: US 8,482,849 B2
(45) Date of Patent: Jul. 9, 2013

(54) RAMAN AMPLIFIER AND CONTROL METHOD THEREOF

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 787 days.

(21) Appl. No.: 12/585,045

(22) Filed: Sep. 1, 2009

(65) Prior Publication Data

US 2010/0073762 A1    Mar. 25, 2010

(30) Foreign Application Priority Data

Sep. 19, 2008 (JP) .................. 2008-240356
Jun. 25, 2009 (JP) .................. 2009-151191

(51) Int. Cl.
*H04B 10/17* (2006.01)
*H04B 10/12* (2006.01)

(52) U.S. Cl.
USPC ...................... 359/334; 359/341.33

(58) Field of Classification Search
USPC ................ 359/334, 341.3, 341.33
See application file for complete search history.

(56) References Cited

U.S. PATENT DOCUMENTS

| | | | |
|---|---|---|---|
| 6,433,922 B1 * | 8/2002 | Ghera et al. | 359/334 |
| 7,145,718 B2 * | 12/2006 | Sugaya et al. | 359/341.41 |
| 7,174,097 B2 * | 2/2007 | Alleston et al. | 398/16 |
| 2002/0118442 A1 * | 8/2002 | Ghera et al. | 359/334 |
| 2002/0181074 A1 * | 12/2002 | Seydnejad et al. | 359/334 |
| 2003/0095323 A1 | 5/2003 | Onaka et al. | |
| 2005/0024712 A1 * | 2/2005 | Hiraizumi et al. | 359/334 |
| 2005/0099676 A1 | 5/2005 | Tokura et al. | |
| 2008/0158657 A1 | 7/2008 | Muro et al. | |
| 2008/0158658 A1 | 7/2008 | Sugaya | |

FOREIGN PATENT DOCUMENTS

| | | |
|---|---|---|
| JP | 2002-76482 | 3/2002 |
| JP | 2004-193640 | 7/2004 |
| JP | 2008-164836 | 7/2008 |
| JP | 2008-182679 | 8/2009 |

* cited by examiner

*Primary Examiner* — Eric Bolda
(74) *Attorney, Agent, or Firm* — Staas & Halsey LLP

(57) ABSTRACT

A Raman amplifier, at the time of start up or the like, drives a predetermined number of pump light sources among a plurality of pump light sources, in a stable region, and judges a Raman gain in the transmission line, and based on the judgment result, specifies a pump light source to switch on and a pump light source to switch off, among the plurality of pump light sources, and controls the drive state of the pump light sources that are switched on. As a result, the plurality of pump light sources are appropriately driven corresponding to the system requirements so that stable behavior is possible, and constant control of Raman gain can be realized at a high accuracy.

14 Claims, 18 Drawing Sheets

FIG.4
ALL PUMP LIGHT SOURCES 11-1, 11-2, 11-3, 11-4 ON
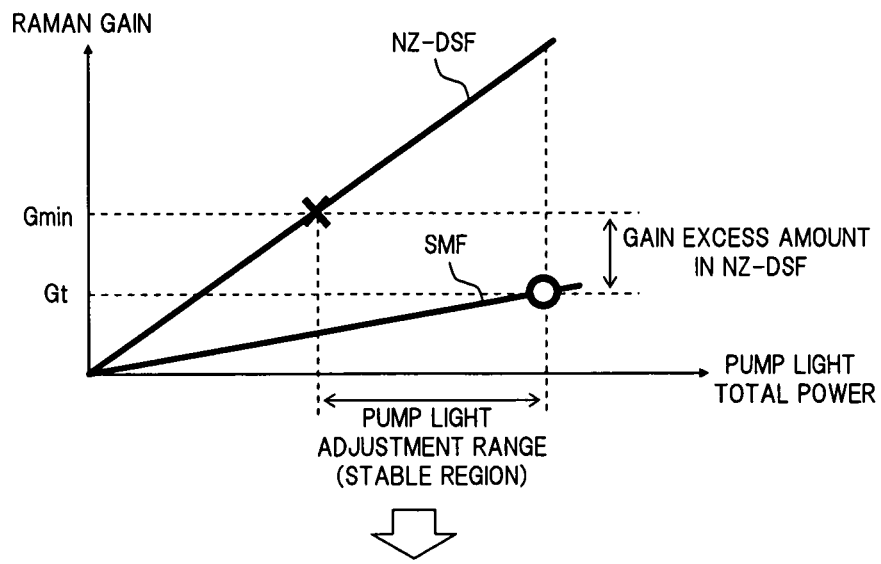
PUMP LIGHT SOURCES 11-1, 11-3 OFF, PUMP LIGHT SOURCES 11-2, 11-4 ON
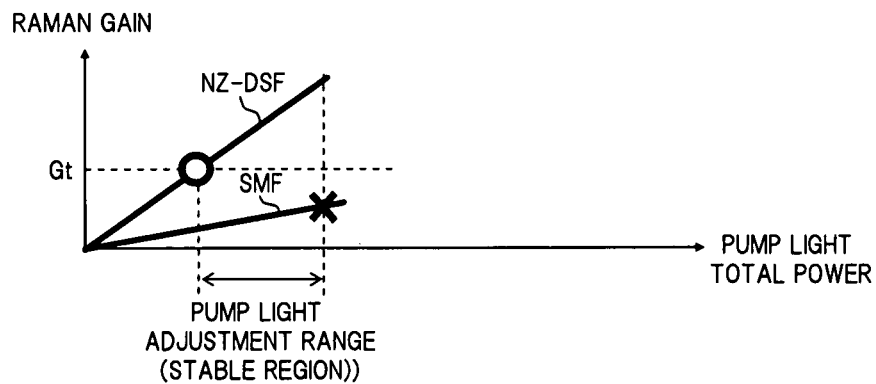
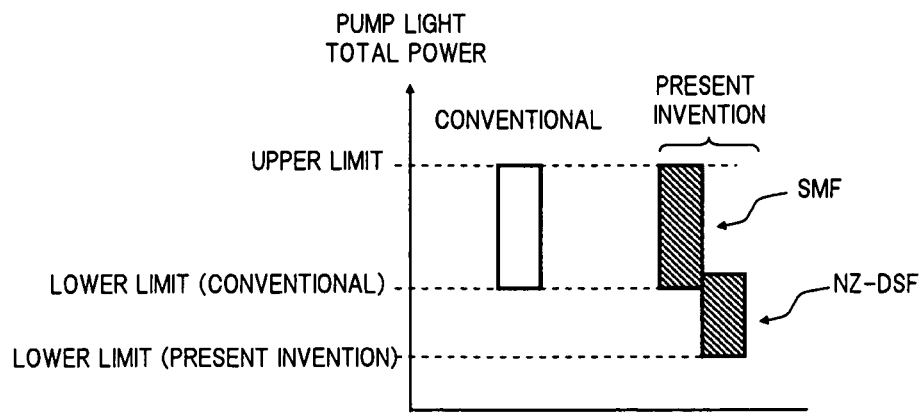

FIG.19
RELATED ART
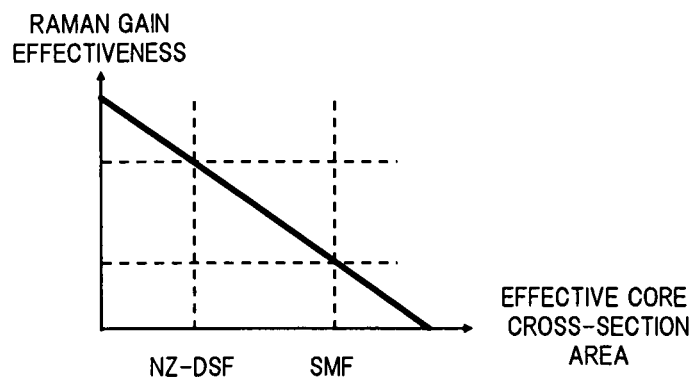
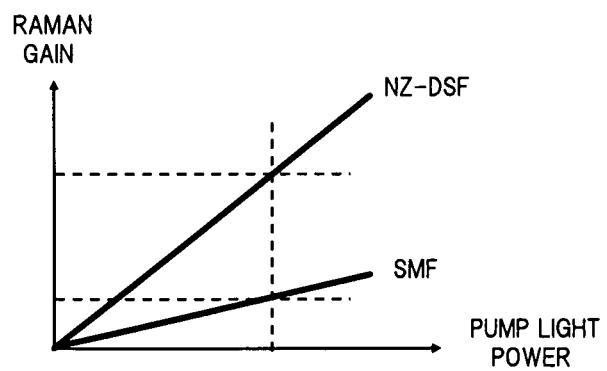
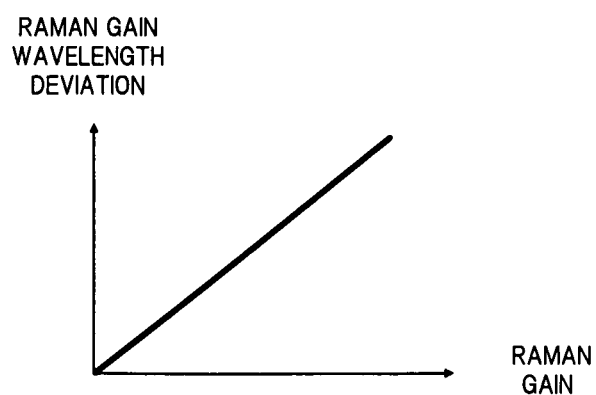

FIG.20
RELATED ART
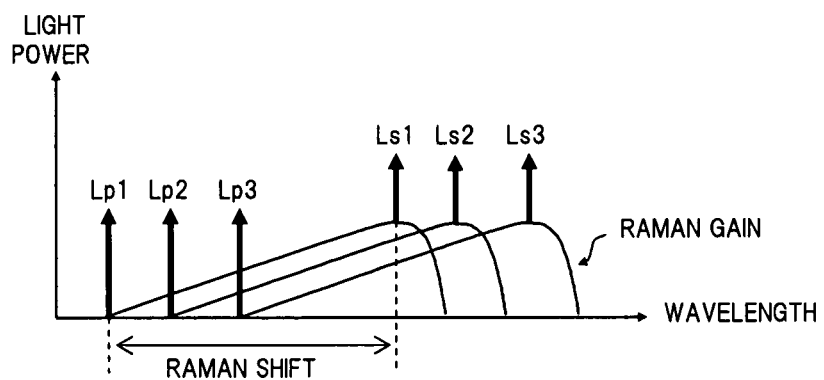
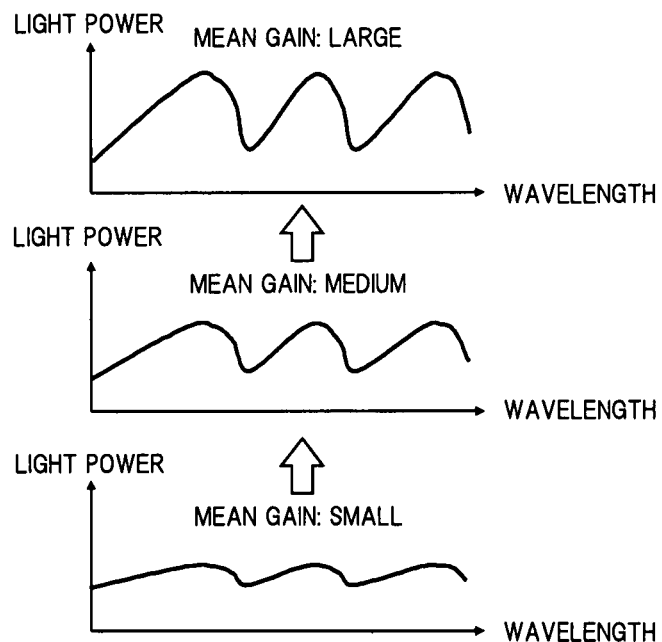

RAMAN AMPLIFIER AND CONTROL METHOD THEREOF

CROSS-REFERENCE TO RELATED APPLICATION

This application is based upon and claims the benefit of priority of the prior Japanese Patent Application No. 2008-240356, filed on Sep. 19, 2008, and the Japanese Patent Application No. 2009-151191, filed on Jun. 25, 2009, the entire contents of which are incorporated herein by reference.

FIELD

The present invention relates to a Raman amplifier that supplies pump light to a transmission line, and distributed Raman amplifies wavelength division multiplexing (WDM) signal light propagated on the transmission line, and to a control method thereof.

BACKGROUND

With a background of the recent increase in communication traffic, the demand for optical communication transmission equipment is increasing. Not only for optical repeating nodes that are being introduced in backbone networks, but also recently introduction of optical communication transmission equipment is being actively performed for local networks. Furthermore optical networks are formed for subscriber loops. Such optical communication systems play an important role with respect to world information networks.

As a typical optical communication system, the optical amplifier repeating transmission system in which for example optical repeating nodes provided with a WDM optical amplifier such as an erbium-doped fiber amplifier (EDFA) are arranged on a transmission line, to thereby give low cost and high reliability, and realize transmission over long distances with large capacity, is mainstream.

In such an optical amplifier repeating transmission system, if the repeating length between nodes becomes long, losses on the transmission line increase. Furthermore, in the case where optical components with various functions are arranged on the light transmission line, losses in the functional optical components are added so that the repeating losses become even greater. Therefore, the input level of the signal light to the WDM optical amplifier of each optical repeating node becomes less, and the optical signal to noise ratio (OSNR) that expresses the intensity ratio of the signal light to the noise light drops, so that there is a possibility of a deterioration in transmission characteristics.

As one means for avoiding this deterioration in transmission characteristics due to the increase in repeating losses, there is known for example a distributed Raman amplifier (DRA) that supplies pump light to a transmission line arranged on an input side of a WDM optical amplifier, and Raman amplifies by using amplification due to a stimulated Raman scattering affect on the signal light propagated on the transmission line. In a system that uses this distributed Raman amplifier, by increasing the input level to the WDM optical amplifier, the OSNR is increased and the transmission characteristics improved, so that the number of spans that can transmit the WDM signal light is increased. Consequently, the distributed Raman amplifier is effective as a means for avoiding the deterioration in transmission characteristics, and has reached a stage of practical use.

FIG. 17 is an example of a common WDM optical communication system that uses a distributed Raman amplifier. Here a transmitter section (Tx) 501 and a receiver section (Rx) 502 are connected by a transmission line 503, and optical amplifiers 504 such as EDFAs are arranged at a required spacing on the transmission line 503. Furthermore, pump light sources 505 for injecting pump light for Raman amplification are provided on the transmission line 503 of each repeating section. Accordingly to such a system configuration, the WDM signal light on the transmission line 503 of the respective repeating sections is distributed Raman amplified by the pump light from the respective pump light sources 505, so that the losses are compensated. As a result the transmission characteristics of the WDM signal light that reaches the receiver section 502 are improved.

Incidentally, for the distributed Raman amplification, it is known that due to wavelength dependency of the Raman gain, a wavelength deviation occurs in the output light power after amplification. This wavelength deviation of the output light power in the distributed Raman amplification, in a WDM optical communication system as illustrated in FIG. 17, accumulates while being increased by the optical amplifiers 504 (in line amplifiers) of the respective repeating sections. Therefore, as illustrated schematically at the top of FIG. 17, a large wavelength deviation occurs in the power of the WDM signal light that reaches the receiver section 502. This accumulation of the wavelength deviation of the signal light power may deteriorate the transmission characteristics of the WDM signal light, due to factors such as nonlinear phenomena of the transmission line, OSNR deterioration, or exceeding the input range of the receiver.

This wavelength deviation of the output light power of the Raman amplifier may be reduced by having a plurality of pumping wavelengths for the Raman amplifier, and appropriately adjusting the pump light power at each pumping wavelength. However an increase in the pumping wavelengths makes the optical circuit configuration and the control mechanism for the Raman amplifier complicated, and hence there is a problem of an increase in cost of the Raman amplifier. To address this problem, for example as illustrated in FIG. 18, there is known a method where a gain equalizer (GEQ) 506 having a fixed loss wavelength characteristic such as to negate the gain wavelength characteristic of the Raman amplifier, is inserted in each of the repeating sections (for example refer to Japanese Laid-open Patent Publication No. 2002-76482).

However, for the conventional method that uses the above gain equalizer, there is a demerit in that for example due to system requirements such as the kinds of transmission lines, the number of wavelengths of the WDM signal light, and the setting of the Raman gain, the gain wavelength characteristics of the Raman amplifier change significantly, and hence it is difficult to reliably compensate the wavelength deviation of the output light power of the Raman amplifier by the gain equalizer.

More specifically, in the case where the types of transmission lines are different, the effective core cross-section areas differ due to the transmission line type, and the situations in which the non linear phenomenon occurs corresponding to the effective core cross-section areas differ. Therefore the efficiency of the Raman effect differs significantly. For example, if a typical single mode fiber (SMF) and a non-zero dispersion shifted fiber (NZ-DSF) are compared, then as illustrated at the top of FIG. 19 the NZ-DSF with the small effective core cross-section area obtains a higher Raman gain efficiency than the SMF with the large effective core cross-section area. Gain efficiency is defined as "gain/pump light total power". Therefore, as illustrated at the center of FIG. 19, the Raman gain obtained when pump light of a required power is supplied is greater in the NZ-DSF than in the SMF. If a difference occurs in the Raman gain with respect to the required pump light power, then as illustrated at the bottom of FIG. 19, the wavelength difference of the Raman gain (output light power) increases in proportion to the Raman gain.

FIG. 20 schematically illustrates the Raman gain for the case where three pump lights Lp1, Lp2 and Lp3 with different wavelengths are supplied to the transmission line. In this case, the wavelength characteristics of the Raman gain become a characteristic where the gains corresponding to the respective pump lights are overlapped, and the wavelength difference of the output light power expands as the mean gain set in the Raman amplifier becomes larger. Such a wavelength difference in the output light power of the Raman amplifier changes with the system requirements such as the types of transmission lines that are connected. Therefore it is not easy to compensate for this change with a gain equalizer in which the loss wavelength characteristics are fixed.

In order to address the defects in the above conventional method, it is effective to accurately execute control that makes the gain of the Raman amplifier constant, and suppress changes in the gain wavelength characteristics to a minimum. In order to realize gain constant control of a Raman amplifier corresponding to various types of system requirements, the Raman amplifier must have an optical circuit structure and control mechanism that can supply pump light across a wide range from minute power to excessive power, to the transmission line.

That is to say, the necessary pump light power to obtain the required Raman gain, as illustrated at the middle of FIG. 19, changes significantly with the type of transmission line. Furthermore, this also changes corresponding to the number of wavelengths of the WDM signal light. Moreover, there is the possibility that this also changes due to a generation status of the optical loss in the vicinity of the end of the transmission line on the pump light input side. Examples of this optical loss in the vicinity of the end of the transmission line on the pump light input side include for example optical connector loss, loss due to pressing or twisting of the optical fibers acting from the outside, or loss due to the structure or material of the optical fiber. In order to realize gain constant control of the Raman amplifier assuming the above various factors, increasing the power adjustment range of the Raman amplifier pump light is an essential condition.

However, as one factor that prevents an increase in the power range of the Raman amplifier pump light, there is the unstable oscillation operation of the pump laser, which is a problem for the realization of gain constant control of the Raman amplifier. For the pump laser that is normally used as a pump light source for the Raman amplification, it is known that in the vicinity of the oscillation threshold value and in the vicinity of the maximum absolute rating, the output wavelength and the output power both become unstable. That is to say, there is a limit to the lower limit and the upper limit for the range where the pump laser oscillates stably. Raising this upper limit enables better correspondence to high output type pump lasers, but there is a problem as to how far the lower limit can be lowered.

In relation to the unstable oscillation operation on the low output side of the pump laser, it is known that in the light emission region in the vicinity of where the oscillation threshold value is exceeded, a mismatch occurs between the gain peak wavelength and the oscillation wavelength of the pump laser, so that multi-mode oscillation and single mode oscillation occur irregularly, and the oscillation operation becomes unstable. In order to avoid this unstable oscillation operation, the lower limit of the pump light power must be set to a level where it is never low, corresponding to the characteristics of the individual pump lasers. In a case where this lower limit level is lowered, there is a high possibility that the pump laser becomes unstable oscillation operation, so that it is likely that a desired spectrum or power cannot be obtained for the pumping light for Raman amplification.

When the pumping wavelength fluctuates due to unstable oscillation characteristics of the pump laser, the spectrum of the Raman gain also becomes unstable, and a wavelength deviation of the output light power of the Raman amplifier occurs. Furthermore, when the pump light power fluctuates due to unstable oscillation characteristics of the pump laser, then there is a time where the desired Raman gain cannot be obtained, and the improvement effect of the OSNR due to Raman amplification that is assumed at the time of the system design cannot be obtained. Consequently, even considering the unstable oscillation characteristics of the pump laser, there is a demand to increase the adjustment range of the pump light power (in particular to lower the lower limit), and to realize gain constant control of the Raman amplifier.

In a general pumping configuration for the distributed Raman amplifier, for example as illustrated in FIG. 21, the respective pump lights output from the plurality of pump light sources 511-1 to 511-4 with different oscillation wavelengths, is combined and supplied to the transmission line 503, and Raman amplification is performed with respect to all of the wavelength regions of the WDM signal light Ls. Furthermore, in order to obtain a large pump light power, the configuration is such that pump lasers of a high output type are employed as the respective pump light sources 511-1 to 511-4, and pump light pairs with adjacent wavelengths are polarized and combined by polarization beam combiners 512-1 and 512-2. The output power of the respective pump light sources 511-1 to 511-4 is controlled by a control circuit 515, so that each of the pump lights that are combined by the polarization beam combiners 512-1 and 512-2 is combined by a multiplexer 513 and then supplied to the transmission line 503 via a multiplexer 514.

In the pumping configuration such as in FIG. 21, if the output power from each of the pump light sources 511-1 to 511-4 is less than the lower limit, the before-mentioned unstable oscillation operation occurs. That is to say, in a general pumping configuration for a distributed Raman amplifier, the configuration is such that consideration is given to raising the upper limit of the aforementioned pumping light power, so that lowering the lower limit becomes a problem. In order to avoid the occurrence of the aforementioned unstable oscillation operation, it is effective for example, to not drive a part of the plurality of pump light sources 511-1 to 511-4, and to drive the remaining pump light sources at an output power not less than the lower limit, and thus lower the total power of the pump light Lp for supply to the transmission line 503.

However, in the case where, as above, a part of a plurality of pump light sources is made non-driven, the wavelength deviation of the WDM signal light power after Raman amplification increases. Furthermore, a problem where the polarization dependency of the Raman gain increases occurs. This problem will be explained specifically while referring to FIG. 22.

As illustrated at the top of FIG. 22, in the case where all of the four pump light sources 511-1 to 511-4 are driven at a predetermined output power, a Raman gain is obtained having; a peak corresponding to the pump light on the short wavelength side that has been output from the pump light sources 511-1 and 511-2 and polarization combined by the polarization combiner 512-1, and a peak corresponding to the pump light on the long wavelength side that has been output from the pump light sources 511-3 and 511-4 and polarization combined by the polarization combiner 512-2. By amplifying the WDM signal light in accordance with the wavelength characteristics of this Raman gain, a wavelength deviation occurs in the signal light power of the respective wavelengths. However, this wavelength deviation in the signal light power is normal, and is compensated for by application of a gain equalizer 506 in which the loss wavelength characteristics are designed so as to cancel the wavelength characteristics of the Raman gain. Here, in order to simplify the explanation, the output powers of the respective pump light sources are made the same. However actually, considering the wavelength arrangement of the respective pump lights and the inter-signal Raman effect and the like, the powers of the respective pump lights are often different.

On the other hand, in the case where for example, of the four pump light sources 511-1 to 511-4, the pump light sources 511-1 and 511-2 on the short wavelength side are not driven and the pump light sources 511-3 and 511-4 on the long wavelength side are driven at a required output power, so that the total power of the pump light Lp supplied to the transmission line 503 is lowered, then as illustrated at the center of FIG. 22, in the wavelength characteristics of the Raman gain, the peak on the short wavelength side disappears, and there is only the peak on the long wavelength side. In this state, the wavelength deviation of the signal light power after Raman amplification increases and the loss wavelength characteristics of the gain equalizer 506 become incompatible. Therefore a transmission error occurs in the signal light on the short wavelength side.

Furthermore, in the case where for example, one of the two pump light sources where the pumping wavelengths are adjacent (here, the pump light source 511-4 of the pump light sources 511-3, 511-4 on the long wavelength side) is not driven, then as illustrated at the bottom of FIG. 22, in the wavelength characteristics of the Raman gain, the peak on the long wavelength side is lower than the peak on the short wavelength side. Also in this state, the loss wavelength characteristics of the gain equalizer 506 become incompatible. Therefore a wavelength deviation occurs in the signal light power after passing through the gain equalizer 506, and together with this, a bias occurs in the polarization state of the pump light Lp supplied to the transmission line 503. Consequently the polarization dependency of the Raman gain is also increased.

Considering this problem, in the general pumping configuration as illustrated in FIG. 21, conventionally it has been practical to drive all of the pump light sources 511-1 to 511-4, and to increase and decrease the output powers of each uniformly at the same time. For this it is convenient to raise the upper limit of the output power of the pump light sources 511-1 to 511-4, and make the pump light power supplied to the transmission line 503 a maximum. However, even if the individual pump light sources 511-1 to 511-4 are driven at the lower limit of the output power, a large number of pump lights are combined and supplied to the transmission line 503. Therefore the total power of the pump light Lp becomes great, so that the effect of lowering the lower limit is not obtained. That is to say, lowering of the lower limit of the pump light total power supplied to the transmission line 503 becomes a problem.

In a state where all of the pump light sources 511-1 to 511-4 are driven, as one technique for lowering the total power of the pump light Lp supplied to the transmission line 503, a configuration is considered where, for example as illustrated in FIG. 23, a variable optical attenuator (VOA) 516 is inserted on the pump light optical path positioned between the two multiplexers 513 and 514. In this configuration, each of the pump light sources 511-1 to 511-4 is oscillation operated stably by driving at an output power not less than the lower limit, and the power of the pump light Lp for which the respective pump lights have been combined into one by the polarization beam combiners 512-1 to 512-2 and the combiner 513, is attenuated by the variable optical attenuator 516. As a result, pump light Lp with a small total power can be stably supplied to the transmission line 503.

Moreover, as another technique to that described above, for example there is proposed a technique to provide an erbium-doped fiber (EDF) on the output side of the Raman amplification pump light source, and use the absorption property of the EDF to avoid the unstable oscillation characteristics of the pump laser (refer for example to Japanese Laid-open Patent Publication No. 2008-164836). In this conventional technique, by using the physical phenomena where when the pump light power input to the EDF is large, the absorption of the EDF becomes small, while when the pump light power is small, the absorption of the EDF becomes large, the pump light source is operated stably at the time of minimum gain, and the variable range for the Raman gain is extended.

However, in the configuration illustrated in FIG. 23 that employs the variable optical attenuator, in the case where it is necessary to supply pump light Lp of a large total power to the transmission line 503, the output power of the respective pump light sources is wastefully consumed due to the insertion loss of the variable optical attenuator 516, and hence this becomes a factor for limiting the upper limit of the supply power of the pump light Lp to the transmission line 503. Therefore, there is a problem in that the adjustment range that includes both the upper limit and the lower limit of the pump light power cannot be extended.

Furthermore, in the conventional technique where the above EDF absorption property is used, there is a problem in that losses of pumping system increase when the pump light power is large. That is to say, compared to when the pump light power is small, when the pump light power is large, the EDF absorption becomes comparatively small, and the very existence of the EDF acts as a loss medium irrespective of the magnitude of the power with respect to the output light from the pump light source. Moreover, the absorption of the pump light in the EDF changes due to slight modifications to the erbium doping density or the EDF length. Therefore it is necessary to also consider the individual variations in the absorption of the EDF that is actually connected to the output side of the pump light source. Furthermore, the mode field diameter of the EDF is different to the mode field diameter of the single mode fiber that is generally associated with the usual optical components. Therefore it is necessary to allow for losses at both ends of the EDF (approximately 0.5 dB×2 places) when optical components other than the EDF are fusion spliced. If the above loss generated by providing the EDF on the output side of the pump light source, and variations in this loss are considered, then compared to the case where the EDF is not provided, it is necessary to prepare a pump light source that obtains a higher output. Therefore this invites a cost increase for the Raman amplifier.

Moreover, due to the pump light receiving the losses due to the absorption property of the EDF, the driving current for the pump light source necessary for realizing the required gain is increased. Therefore there is a problem in that the power consumption of the Raman amplifier is increased. Furthermore, there is also a problem of installation space for the EDF inside the Raman amplifier. More specifically, the EDF with a length of several meters and the two splice securing tubes that are applied to both ends of the EDF are added to the configuration of the existing Raman amplifier. Normally, since a Raman amplifier uses a pump light source of a high output, it is necessary to ensure a wide radiation space compared to for the other components. Taking this point into consideration, the abovementioned addition of optical components is unsuitable in packaging design, and in order to enable packaging, enlargement of the Raman amplifier cannot be avoided.

In order to realize an extension of the adjustment range for the pump light power, it has also been considered to respectively develop; an pump laser that has been made (designed) adjusted for a large pump light power region, and an pump laser that has been made (designed) adjusted to a small pump light power region, and to also prepare gain equalizers corresponding to each of these, and to suitably select and install the pump laser and the gain equalizer in accordance with the type or environmental conditions of the transmission line. However, in this technique, the variety of pump lasers and gain equalizers corresponding to the types of transmission lines, becomes extremely large. Therefore, their management becomes extremely complex so that this is not practical.

Furthermore, it has also been considered to apply a tilt monitor for detecting the wavelength characteristics of the Raman gain, and a gain equalizer in which the loss wavelength characteristics are changeable, and to suppress the wavelength deviation of the signal light power after Raman amplification, to thereby lower the lower limit of the pump light power. However, in this technique, due to the insertion loss of the tilt monitor and the variable gain equalizer, the transmission characteristics such as OSNR of the WDM signal light deteriorate significantly, so that it becomes necessary to increase the Raman pump light power in order to compensate for the insertion loss. Therefore, the above technique is also impractical from the view point of; use of a higher output pump light source, an increase in power consumption, and the complexity of the optical circuit configuration and the control mechanism.

SUMMARY

According to an aspect of the invention provides a Raman amplifier that supplies pump light to a transmission line, and distributed Raman amplifies wavelength multiplexed signal light that propagates on the transmission line. This Raman amplifier includes: a Raman pump light supply section configured to have a plurality of pump light sources with different wavelengths, and to supply pump light output from the respective pump light sources to the transmission line; a monitor section configured to monitor the light propagated on the transmission line, to acquire information necessary for judging Raman gain in the transmission line; and a control section configured to judge the Raman gain in the transmission line using information acquired by the monitor section in a state where a predetermined number of pump light sources among the plurality of pump light sources are driven in a stable region where the output wavelength and the output power become constant timewise, and to specify the pump light source to be switched on and the pump light source to be switched off, among the plurality of pump light sources based on the judgment result, and to control the drive state of the pump light source that is specified to be switched on.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram for explaining details of a control for switching a pumping light source off.

FIG. 19 is a diagram for explaining changes in Raman gain efficiency and the like due to differences in the type of transmission line.

FIG. 20 is a diagram schematically illustrating changes in wavelength characteristics of Raman gain due to differences in mean gain.

DESCRIPTION OF EMBODIMENTS

Hereunder is a description of an embodiment of the invention, with reference to the appended drawings.

Figure 1:
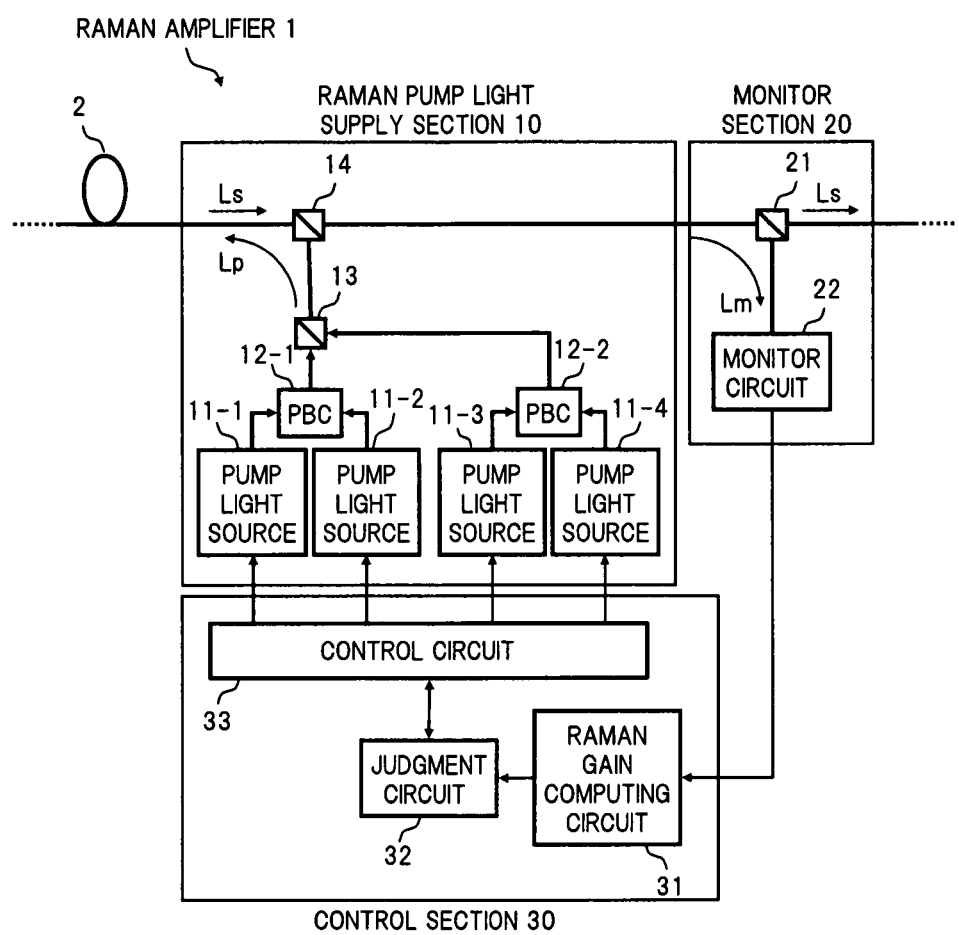
FIG. 1 is a block diagram illustrating a configuration of a first embodiment of a Raman amplifier according to the invention.

FIG. 1 is a block diagram illustrating a configuration of a first embodiment of a Raman amplifier according to the invention.

In FIG. 1, a Raman amplifier 1 of this embodiment comprises for example: a Raman pump light supply section 10 that supplies pump light for Raman amplification to a transmission line 2; a monitor section 20 that acquires information necessary for computing Raman gain in the transmission line 2; and a control section 30 that computes Raman gain based on the information acquired by the monitor section 20, and controls the Raman pump light supply section 10 corresponding to the computation value for the Raman gain.

Specifically, the Raman pump light supply section 10 has for example: a plurality of (here for example four) pump light sources 11-1, 11-2, 11-3, and 11-4; two polarization beam combiners (PBC) 12-1, and 12-2; a pump light combiner 13; and a signal light/pump light combiner 14.

The pump light sources 11-1 to 11-4 use a general semiconductor laser (pump laser) as a pump light source for Raman amplification, and are set so that their output wavelengths at the time of stable operation of the pump lasers become different to each other, and generate pump light that is capable of Raman amplifying the WDM signal light propagated on the transmission line 2. A control signal output from a later mentioned control circuit 33 of the control section 30, is provided to each of the pump light sources 11-1 to 11-4, and each of the drive states are controlled so that the Raman gain in the transmission line 2 becomes a constant.

The polarization beam combiner 12-1 combines the respective pump lights output from the pump light sources 11-1 and 11-2 under different polarization states into one, and outputs this to one input port of the pump light combiner 13. Furthermore, the polarization beam combiner 12-2 combines the respective pump lights output from the pump light sources 11-3 and 11-4 under different polarization states into one, and outputs this to the other input port of the pump light combiner 13.

The pump light combiner 13 combines the pump lights provided to the respective input ports from the polarization beam combiners 12-1 and 12-2 into one, and outputs the combined pump light Lp to the signal light/pump light combiner 14.

Here an example is illustrated where the respective pump lights output from the four pump light sources 11-1 to 11-4 are separated into two stages and combined. However the number of pump light sources in the Raman amplifier of the invention and the configuration for combining the pump lights is not limited to the above example.

The signal light/pump light combiner 14 supplies the pump light Lp from the pump light combiner 13 from a backward side (signal light output end side) to the transmission line 2. The pump light Lp supplied to the transmission line 2 is transmitted in an opposite direction to the propagation direction of the WDM signal light Ls inside the transmission line 2. Furthermore, the signal light/pump light combiner 14 transmits WDM signal light Ls transmitted on the transmission line 2 and lights propagating in the same direction as the WDM signal light Ls, to a later stage monitor section 20. The lights propagating in the same direction as the WDM signal light includes OSC light or gain reference light described later, noise light generated due to Raman amplification, and so forth.

The monitor section 20 has for example a branching device 21 and a monitor circuit 22.

The branching device 21 takes out a part of the WDM signal light that has passed to the signal light/pump light combiner 14, or the lights propagating in the same direction as the WDM signal light, as monitor light Lm and sends this to the monitor circuit 22.

The monitor circuit 22 monitors the power and the like of the monitor light Lm from the branching device 21 to thereby acquire information necessary for computing Raman gain in the transmission line 2, and transmits the information to the control section 30. Details of the information acquired by the monitor circuit 22 are described later.

The control section 30 has for example; a Raman gain computing circuit 31, a judgment circuit 32, and a control circuit 33.

The Raman gain computing circuit 31 uses information acquired by the monitor circuit 22 to compute the Raman gain in the transmission line 2, and outputs a signal representing the computation result to the judgment circuit 32.

The judgment circuit 32 compares the computation value for the Raman gain represented in the output signal from the Raman gain computing circuit 31 with a previously set target value for Raman gain, and judges a magnitude correlation, and outputs a signal representing the judgment result to the control circuit 33. The target value for Raman gain is set in accordance with design conditions and the like of the WDM optical transmission system configured using the Raman amplifier 1.

The respective processings in the control section 30 and the judgment circuit 32, can be executed by digital signal processing using an AD converter and CPU or the like, or by signal processing in which an analog circuit is combined.

The control circuit 33 specifies the pump light source to be switched on and the pump light source to be switched off out of the pump light sources 11-1 to 11-4, in accordance with the judgment result by the judgment circuit 32, following a later described control sequence that is executed at the time of starting the Raman amplifier 1, and adjusts the power of the pump light output from the pump light source that is specified to be switched on, to thereby control the Raman gain in the transmission line 2 to the target value. Furthermore, the control circuit 33 outputs a signal representing the present control state (drive current or output power) of the respective pump light sources 11-1 to 11-4, to the judgment circuit 32.

Figure 2:
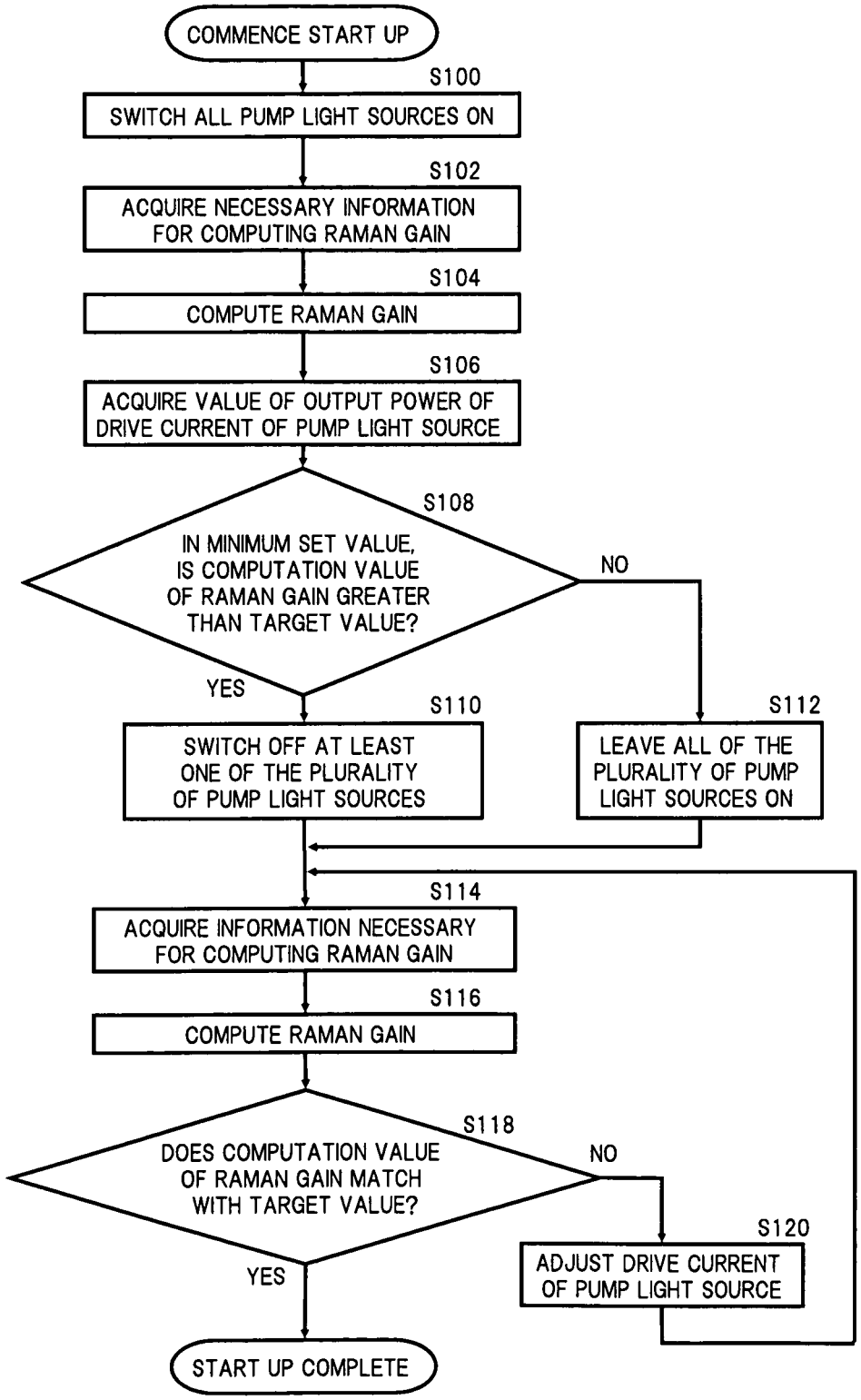
FIG. 2 is a flow chart illustrating a control method of a pump light source using a control section in the first embodiment.

Here a method of controlling the pump light sources 11-1 to 11-4 by the control section 30 is described in detail, with reference to the flow chart of FIG. 2.

When the start up operation for the Raman amplifier 1 has commenced, at first, in step 100 (indicated by S100 in FIG. 2, and similarly hereunder), a control signal that drives all of the pump light sources 11-1 to 11-4 at the lower limit of the stable region, is output from the control circuit 33 to the respective pump light sources 11-1 to 11-4.

The stable region means an operating region where the output wavelength and output power of the pump lasers used as the pump light sources 11-1 to 11-4 become constant timewise. By driving the pump laser within the stable region, the output wavelength of the pump laser becomes stable with no timewise fluctuations. Furthermore, the relationship of the output power with respect to the drive current becomes linear. That is, by providing the necessary drive current within the stable region to the pump light source, pump light having a constant wavelength and power with no timewise fluctuations is obtained.

Figure 3:
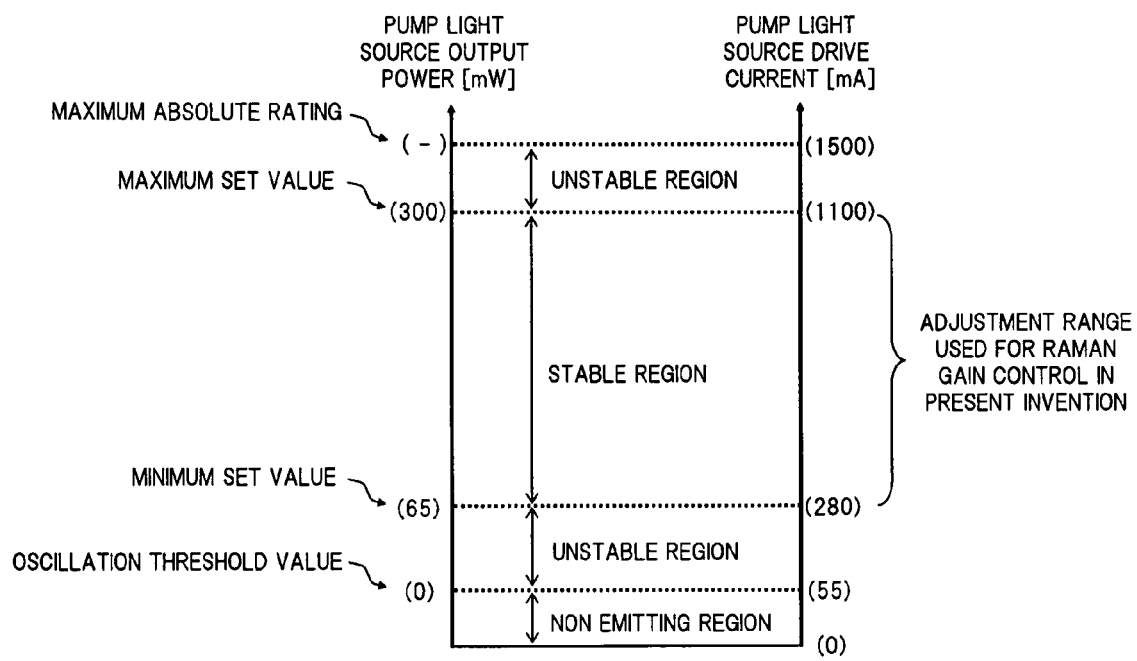
FIG. 3 is a diagram for explaining a stable region of a pump laser.

FIG. 3 is a diagram illustrating a specific example of a stable region of the pump laser. Here change in the operating state of the pump laser is represented in the Y axis direction using two parameters, namely the output power of the pump laser and the drive current. The numerical values in parenthesis in the figure illustrate values respectively corresponding to the output power (mW) and the drive current (mA) in the pump laser that is sampled. However, this does not mean that the stable region of the pump laser is limited to these numerical value examples.

In the example of FIG. 3, when the drive current exceeds 55 (mA) corresponding to the oscillation threshold value, light emission of the pump laser is started, and the interval until the drive current reaches 280 (mA) becomes an unstable region where the output wavelength or the output power fluctuates timewise. Then, when the drive current becomes 280 (mA) or more, and the output power becomes 65 (mW) or more, a stable region results where the output wavelength and the output power have no timewise fluctuations. This stable regions exists continuously up until the drive current becomes 1100 (mA), and the output power becomes 300 (mW). When the drive current exceeds 1100 (mA), the relationship of the output power with respect to the drive current is no longer linear, and while the use of the pump laser is possible up until the maximum absolute rating of 1500 (mA), this gives an unstable region where the output power is not stable.

Here to add a simple explanation of the unstable region, as a cause of oscillation unstable operation of the pump laser, there is considered for example: (a) mismatch between the laser chip and the fiber grating for fixing the oscillation wavelength; (b) inducement of unstable oscillation due to the occurrence of improper reflection part way along the longitudinal direction of the oscillator; (c) interference due to reflected returning light; and (d) unbalance in the low output region due to design giving preference to balance in the high output region between oscillations due to Fabry-Perot (FP) and oscillations due to Bragg reflection. In general, as a function of the pump laser, in the high output region in which priority is high, there is a requirement to be able to sufficiently maintain the stability of the output wavelength and the output power. Therefore design of the pump laser is optimized to correspond to this. In such a pump laser, in order to maintain the stability of the output wavelength and the output power so as to be the same as for the high output region even in the low output region, an even more complex optical circuit configuration and its high design accuracy is required. Together with this, a chip and the like formed from a crystal of high quality with a high luminous efficiency, and with a structure excellent in uniformity and its processing method, is required. However, realization of such a pump laser is not easy, and even if this can be realized, it becomes an extremely high cost pump laser.

Therefore, in the control section 30 of the first embodiment, by applying a scheme to the control sequence at the start up time of the Raman amplifier, stability of the output wavelength and the output power in the low output region of the pump laser is ensured, so that use of a general pump laser becomes possible. In this control sequence, the minimum setting value and the maximum setting value of the adjustment ranges of the respective pump light sources 11-1 to 11-4 are defined beforehand corresponding to the lower limit and the upper limit of the stable region of the pump laser used in each. In the case where an pump laser such as the one illustrated in FIG. 3 is used in the respective pump light sources 11-1 to 11-4, then for the minimum set value of the adjustment range of the respective pump light sources 11-1 to 11-4, a drive current: 280 (mA) or an output power: 65 (mW) corresponding to the lower limit of the stable region are determined. Furthermore, a drive current: 1100 (mA) or an output power: 300 (mW) corresponding to the upper limit of the stable region are determined.

Here a specific numerical value for the drive current or the output power of the pump laser is used, and one example specifying the stable region is illustrated. However also other than this, the stable region of the pump laser may be specified on the basis of the oscillation threshold value and the maximum absolute rating that are normally used as the characteristic data of the pump laser. More specifically, it is possible make the lower limit of the stable region of the pump laser, A times the oscillation threshold value (for example A=5) and the upper limit B times the maximum absolute rating (for example B=0.8).

In step 100 (FIG. 2) as described above, when all of the pump light sources 11-1 to 11-4 are driven at the minimum set value (lower limit of the stable region) of the adjustment range, the pump light output from the respective pump light sources 11-1 to 11-4 is supplied to the transmission line 2 via the polarization beam combiners 12-1 and 12-2, the pump light combiner 13, and the signal light/pump light combiner 14. A test light with a wavelength set within the Raman amplification band due to the pump light, is provided to the transmission line 2 from the upstream side, and the test light is Raman amplified by propagating through the transmission line 2. For the test light, it is possible to use for example spontaneous emission (ASE) that is generated by switching on the pump light of the WDM optical amplifier arranged on the signal light input side of the transmission line 2. The Raman amplified test light passes through the signal light/pump light combiner 14 and is input to the monitor section 20, and a part thereof is branched by the branching device 21 as monitor light Lm, and sent to the monitor circuit 22.

In step 102, the power and the like of the monitor light Lm is monitored in the monitor circuit 22, and the monitor result is transmitted to the Raman gain computing circuit 31 of the control section 30.

In step 104, in the Raman gain computing circuit 31, the Raman gain in the transmission line 2 for when all of the pump light sources 11-1 to 11-4 are driven at the minimum set value, is calculated using the monitor result in the monitor circuit 22, and a signal representing the calculated result is output to the judgment circuit 32.

In step 106, the drive states of the respective pump light sources 11-1 to 11-4 are notified from the control circuit 33 to the judgment circuit 32. As a result, the judgment circuit 32 acquires information related to the present drive current or output power of the pump light sources 11-1 to 11-4.

Figure 21:
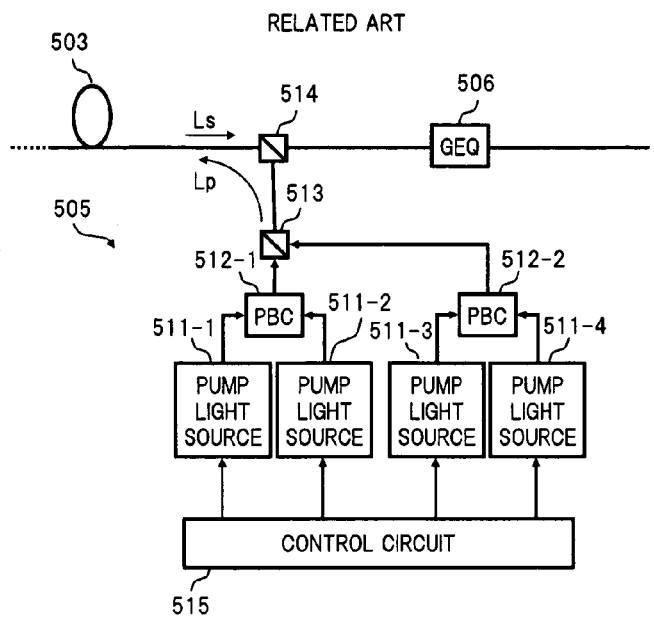
FIG. 21 is a diagram illustrating a general pumping configuration for a distributed Raman amplifier.
Figure 22:
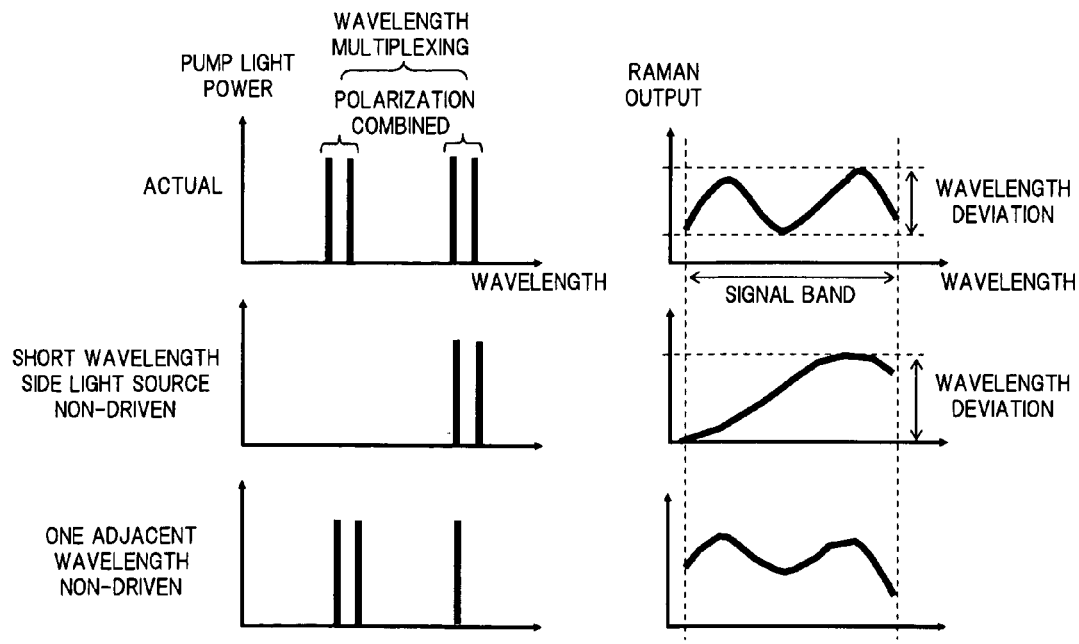
FIG. 22 is a diagram for explaining a point of issue for a case where a part of the plurality of pump light sources in FIG. 21 is made non-driven.
Figure 23:
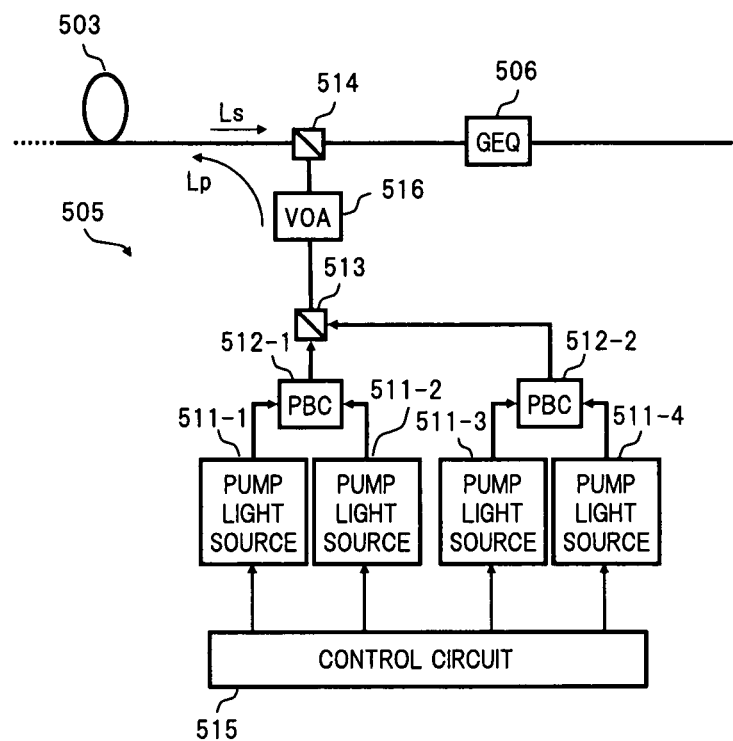
FIG. 23 is a diagram illustrating a configuration example in which the variable optical attenuator in FIG. 21 is applied so as to lower pump light total power.

In step 108, in the judgment circuit 32, after confirming that all of the pump light sources 11-1 to 11-4 are being driven at the minimum set value of the adjustment range, the computation value of the Raman gain obtained by the Raman gain computing circuit 31 is compared with a previously set target value for the Raman gain, and the judgment result of the magnitude correlation of the computation value with respect to the target value is notified to the control circuit 33. For the target value of Raman gain, for example in the case where as illustrated in the aforementioned FIG. 18, FIG. 21, and FIG. 23, a gain equalizer that cancels the wavelength characteristics of the Raman gain is applied, it is possible to set the Raman gain assumed at the time of designing the gain equalizer, as a target value. In the case where it is judged that the computation value of the Raman gain is greater than the target value, control proceeds to step 110, and in the case where it is judged that the computation value of the Raman gain is less than or equal to the target value, control proceeds to step 112.

In step 110, upon receiving the judgment result that the computation value of the Raman gain is greater than the target value, the control circuit 33 performs control to give an off condition for at least one of the four pump light sources 11-1 to 11-4 that are driven at the minimum set value, that is to say, to give a condition where the drive current is less than the oscillation threshold value, so that there is substantially no light emission. The contents of this control are described in detail with reference to FIG. 4.

FIG. 4 is an example of a relationship of the Raman gain in the transmission line 2 with respect to the total power of the pump light output from the respective pump light sources 11-1 to 11-4, illustrating the above relationship separated into a case where connected to a transmission line 2 that uses the SMF, and a case where connected to a transmission line 2 that uses NZ-DSF. The top of FIG. 4 illustrates a relationship for a state where all of the pump light sources 11-1 to 11-4 are driven at the minimum set value of the adjustment range (the state before executing step 110). On the other hand, the bottom of FIG. 4 illustrates a relationship for a state where for example the pump light sources 11-1 and 11-3 are off, and the pump light sources 11-2 and 11-4 are driven at the minimum set value of the adjustment range (the state after executing step 110).

In the relationship at the top of FIG. 4, in the case where a NZ-DSF is used for the transmission line 2, the Raman gain efficiency of the NZ-DSF is large compared to a SMF (refer to FIG. 19 mentioned later). Therefore the Raman gain Gmin obtained when all of the pump light sources 11-1 to 11-4 are driven at the minimum set value of the adjustment range exceeds the control target value Gt (illustrated by symbol x in the figure). In the case where this drive state is maintained, then due to the gain excess amount with respect to the target value Gt, the previously mentioned Raman gain wavelength deviation occurs which becomes a factor in deteriorating the transmission characteristics. If the Raman gain with all of the pump light sources 11-1 to 11-4 on, is to be made the target value Gt, then some or all of the pump light sources 11-1 to 11-4 must be operated in the unstable region on the low output side (refer to FIG. 3 mentioned before).

On the other hand, in the case where a SMF is used for the transmission line 2, the Raman gain in a state where all of the pump light sources 11-1 to 11-4 are driven at the minimum set value of the adjustment range, does not reach to the control target value Gt. However by increasing the total power of the pump light to within the adjustment range (the range where the adjustment ranges of the respective pump light sources are combined), it becomes possible to make the Raman gain reach to the target value Gt (symbol O in the figure). Consequently, when all of the pump light sources 11-1 to 11-4 are driven at the minimum set value of the adjustment range, if a judgment is made as to whether or not the computation value of the Raman gain obtained in the Raman gain computing circuit 31 is greater than the target value, it can be known whether the Raman gain with all of the pump light sources 11-1 to 11-4 driven in the stable region can be made the target value Gt.

In the case where the computation value of the Raman gain is judged to be greater than the target value, the drive state of at least one of the four pump light sources 11-1 to 11-4, in the example at the middle of FIG. 4, of the two pump light sources 11-1 and 11-3, is switched to off, and the remaining pump light sources 11-2 and 11-4 are driven at the minimum set value of the adjustment range. As a result, as illustrated in the relationship at the middle of FIG. 4, the total power of the pump light is halved, and the adjustment range is also reduced. However in the case where a NZ-DSF is used for the transmission line 2, in the vicinity of the minimum set value of the adjustment range of the pump light total power, it becomes possible for the Raman gain to be at the target value Gt (symbol O in the figure). In the condition with the pump light sources 11-1 and 11-3 off, then in the case where a SMF is used for the transmission line 2, even if the pump light sources 11-2 and 11-4 are driven at the maximum set value of the adjustment range, the Raman gain cannot be the target value Gt (symbol x in the figure). However in the case of a SMF, the computation value of the Raman gain in the judgment of step 108 is judged to be less than or equal to the target value, and in step 112, all of the pump light sources 11-1 to 11-4 are on. Therefore a problem does not arise. That is to say, as illustrated at the bottom of FIG. 4, regarding the total power of the pump light Lp supplied to the transmission line 2, compared to the conventional adjustable range, the lower limit is lowered while maintaining the upper limit.

Figure 5:
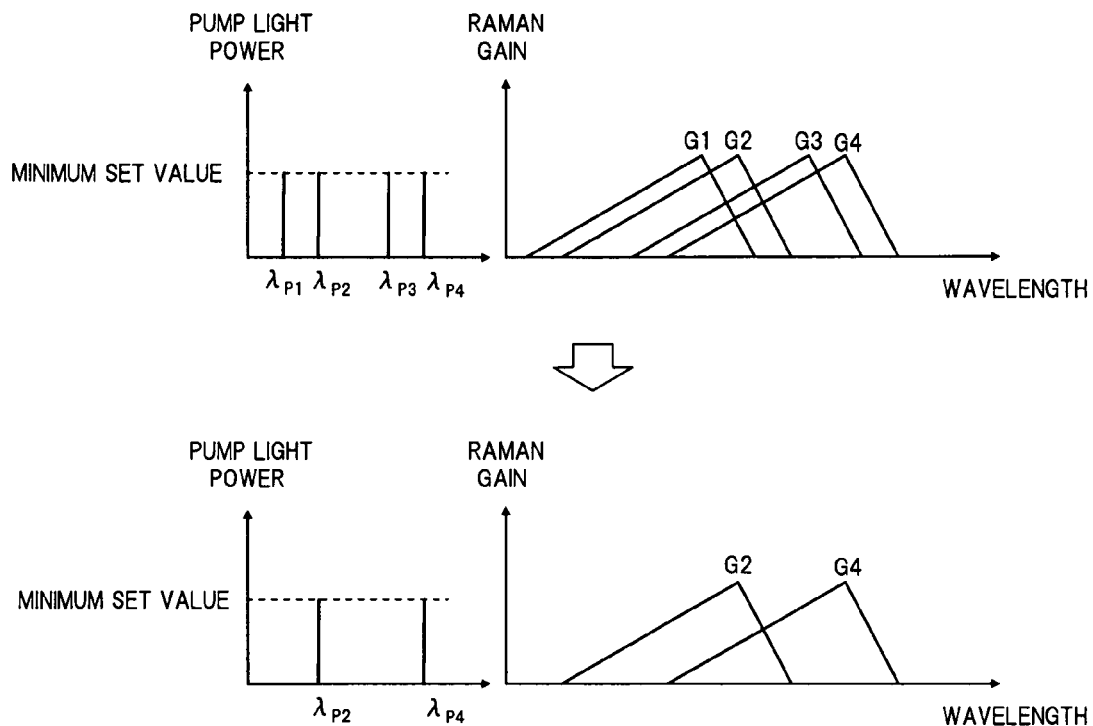
FIG. 5 is a diagram schematically illustrating changes in Raman gain when the pumping light source is switched off.

FIG. 5 schematically illustrates changes in the Raman gain due to switching two pump light sources 11-1 and 11-3 of the four pump light sources 11-1 to 11-4 to off. Here the wavelengths of the pump lights that are output when the pump light sources 11-1 to 11-4 are driven in the stable region are made $\lambda_{P1}$ to $\lambda_{P4}$, and for these pump lights, there is the relationship $\lambda_{P1} < \lambda_{P2} < \lambda_{P3} < \lambda_{P4}$. When all of the pump light sources 11-1 to 11-4 are driven at the minimum set value, then as illustrated at the top of FIG. 5, Raman gains G1 to G4 corresponding to each of the pump lights of wavelengths $\lambda_{P1}$ to $\lambda_{P4}$ are obtained, and the total Raman gain with these superimposed becomes a relatively small characteristic for the wavelength deviation. When from this state the pump light sources 11-1 and 11-3 are switched to off, then as illustrated at the bottom of FIG. 5, Raman gains G2 and G4 corresponding to the pump lights of wavelengths $\lambda_{P2}$ and $\lambda_{P4}$ are obtained. At this time, it is necessary to sufficiently consider the wavelength characteristics for the total Raman gain after switching, and determine which of the pump light sources of the four pump light sources 11-1 to 11-4 to switch off. The selection method for the pump light sources to be switched off is described in detail later giving a specific example.

In the above manner, when the on/off switching of the pump light sources 11-1 to 11-4 is performed corresponding to the judgment result in the judgment circuit 31, control proceeds to step 114, and similarly to the aforementioned step 102, the power and the like of the monitor light Lm in the monitor circuit 22 is monitored, and the monitor result is transmitted to the Raman gain computing circuit 31 of the control section 30. Then, in step 116, in the Raman gain computing circuit 31, the Raman gain in the transmission line 2 is calculated using the monitor result in the monitor circuit 22, and a signal representing the calculation result is output to the judgment circuit 32.

In step 118, in the judgment circuit 32, judgment is made as to whether or not the computation value of the Raman gain obtained by the Raman gain computing circuit 31 is substantially matched with the target value, and the judgment result is notified to the control circuit 33. In the case where the calculation result of the Raman gain is not substantially matched with the target value, control proceeds to step 120, and the control circuit 33 adjusts the drive current of the pump light sources that is switched on, and performs feedback control of the state of the pump light supply to the transmission line 2 so that the Raman gain in the transmission line 2 approaches the target value.

The feedback control may adjust the drive current of each pump light source so that in the case where two or more pump light sources are on, the power ratio of the pump lights output from the respective pump light sources follows the power ratio designed beforehand in consideration of flattening of the wavelength characteristics of the Raman gain. By performing such feedback control, it is possible to more effectively suppress wavelength deviation of the Raman gain. Then, after executing step 120, control returns to the aforementioned step 114, and the same processing is repeated, and in step 118, a substantial match of the computation value of the Raman gain and the target value is judged, and hence the control sequence at the time of start up of the Raman amplifier ends.

In the case where, even if the drive states of the respective pump light sources reach the maximum set value of the adjustment range (or the minimum set value), in step 118 it is judged that the computation value of the Raman gain does not substantially match with the target value, that is, the feedback control does not converge, then it is determined that some kind of abnormality has occurred in the transmission line 2 and an alarm is emitted from the Raman amplifier 1. Together with this, the computation value of the Raman gain at the time of determining the abnormality may be notified to an external device (for example a system management device or an optical amplifier on the transmission line).

By the abovementioned control sequence of step 100 to step 120, in the case where for example a SMF is used for the transmission line, operation of the Raman amplifier 1 is started in a drive state corresponding to symbol "O" at the top of FIG. 4, while in the case where a NZ-DSF is used for the transmission line 2, operation of the Raman amplifier 1 is started in a drive state corresponding to symbol "O" at the middle of FIG. 4. That is, an appropriate number of pump light sources corresponding to the system requirements (in the example of FIG. 4, the types of transmission lines connected to the Raman amplifier 1) are reliably driven within the stable region, so that gain constant control of the Raman amplifier 1 is performed.

Here, in the aforementioned step 110, a selection method for the pump light source to be switched off in the case where the computation value for the Raman gain is greater than the target value will be described in detail while illustrating specific examples.

At first, as an example 1-1, a case where the wavelength band of the WDM signal light that is Raman amplified in the transmission 2 (hereunder called the main signal band) is a C-band of 1530-1565 nm is considered. In this case, if Raman amplification of WDM signal light is performed using four pump light sources, then as the output wavelengths $\lambda_{P1}$ to $\lambda_{P4}$ of the respective pump light sources, for example the following settings are possible. LD1 to LD4 corresponds to the pump light sources 11-1 to 11-4 in FIG. 1.

LD1: $\lambda_{P1}$=1430 nm
LD2: $\lambda_{P2}$=1435 nm
LD3: $\lambda_{P3}$=1455 nm
LD4: $\lambda_{P4}$=1460 nm In these settings, the output wavelengths $\lambda_{P1}$ and $\lambda_{P2}$, and the output wavelengths $\lambda_{P3}$ and $\lambda_{P4}$ are each made close. In such a case, the output wavelengths are close, that is, the difference in the output wavelengths is relatively small, and hence either one of the two pump light sources may be switched off. More specifically, the pump light sources LD1 and LD3 of the wavelengths $\lambda_{P1}$ and $\lambda_{P3}$ may be switched off, or the pump light sources LD2 and LD4 of the output wavelengths $\lambda_{P2}$ and $\lambda_{P4}$ may be switched off. As a result, even after being switched off, it is possible to realize gain wavelength characteristics that are balanced.

The following Table 1 summarizes the on/off pattern of the four pump light sources and their effect, in the above example 1-1.

TABLE 1

| Transmission line condition | Pump light source selection method | LD1 | LD2 | LD3 | LD4 | Effect of lowering pump light lower limit | Signal light wavelength deviation |
|---|---|---|---|---|---|---|---|
| Small gain efficiency | Conventional | ON | ON | ON | ON | x | ○ |
| Large gain efficiency | 1 selected OFF | OFF | ON | ON | ON | Δ | Δ |
| | | ON | OFF | ON | ON | Δ | Δ |
| | | ON | ON | OFF | ON | Δ | Δ |
| | | ON | ON | ON | OFF | Δ | Δ |
| | 2 selected OFF | OFF | OFF | ON | ON | ○ | x |
| | | ON | ON | OFF | OFF | ○ | x |
| | | OFF | ON | OFF | ON | ○ | ○ |
| | | OFF | ON | ON | OFF | ○ | ○ |
| | | ON | OFF | OFF | ON | ○ | ○ |
| | | ON | OFF | ON | OFF | ○ | ○ |
| | 3 selected OFF | OFF | OFF | OFF | ON | ○○ | x |
| | | OFF | OFF | ON | OFF | ○○ | x |
| | | OFF | ON | OFF | OFF | ○○ | x |
| | | ON | OFF | OFF | OFF | ○○ | x |

As illustrated in Table 1, in order to obtain at the same time, both the effect of lowering the lower limit of the pump light power, and the effect of suppressing the wavelength deviation of the signal light power after Raman amplification, any one of the four combinations (illustrated in bold type in Table 1) where one of the two pump light sources LD1 and LD2 on the short wavelength side where the pumping wavelengths are adjacent is turned off, and one of the two pump light sources LD3 and LD4 on the long wavelength side where the pumping wavelengths are adjacent is turned off, is selected. Furthermore, compared to these four combinations, the effect is poor. However, even if any one of the four combinations (illustrated in italic type in Table 1) where one of the four pump light sources is selectively off, is selected, the effect of lowering the lower limit of the pump light power, and the effect of suppressing the wavelength deviation of the signal light power after Raman amplification are obtained at the same time. With respect to a transmission lines in which the gain efficiency of a NZ-DSF or the like is large, in the combinations other than the above eight combinations that obtain a reduction in the lower limit of the pump light power, the wavelength deviation of the signal light power after Raman amplification increases. Therefore, excluding systems where wavelength deviation is not a particular problem, it is basically best to not select these.

In example 1-2, a case where the main signal band is a C-band+L-band is considered. In this case, when two pump light sources are added, and six pump light sources LD1 to LD6 are used to perform Raman amplification of the above signal band, then for the output wavelengths $\lambda_{P1}$ to $\lambda_{P6}$ of the respective pump light sources LD1 to LD6, for example the following settings are possible.

LD1: $\lambda_{P1}$=1430 nm
LD2: $\lambda_{P2}$=1435 nm
LD3: $\lambda_{P3}$=1450 nm
LD4: $\lambda_{P4}$=1455 nm
LD5: $\lambda_{P5}$=1485 nm
LD6: $\lambda_{P6}$=1490 nm In these settings, the output wavelengths $\lambda_{P1}$ and $\lambda_{P2}$, the output wavelengths $\lambda_{P3}$ and $\lambda_{P4}$, and the output wavelengths $\lambda_{P5}$ and $\lambda_{P6}$ are each made close. Therefore by the same thinking as for the case of the abovementioned example 1-1, by switching the pump light sources LD1, LD3, and LD5 of the output wavelengths $\lambda_{P1}$, $\lambda_{P3}$, and $\lambda_{P5}$ off, or switching the pump light sources LD2, LD4, and LD6 of the output wavelengths $\lambda_{P2}$, $\lambda_{P4}$, and $\lambda_{P6}$ off, then even after being switched off, it is possible to realize gain wavelength characteristics that are balanced.

In example 2-1, for a case where the main signal band is a C-band, the polarization state of the output light is also considered in addition to the output wavelength of the respective pump light sources, and the pump light source to switch off is selected so that pump lights with different polarization states are combined and supplied to the transmission line. More specifically, here a case is considered where the polarization states (TE/TM mode) of the output light of the four pump light sources LD1 to LD4 are set for example as follows.

LD1: $\lambda_{P1}$=1430 nm, TE
LD2: $\lambda_{P2}$=1435 nm, TM
LD3: $\lambda_{P3}$=1455 nm, TM
LD4: $\lambda_{P4}$=1460 nm, TE In these settings, in the case where LD1 for the combination of the pump light sources LD1 and LD2 with close output wavelengths is switched off, the output light of LD1 is the TE mode. Therefore for the combination of the remaining pump light sources LD3 and LD4, LD3 of which the output light is the TM mode is switched off. Furthermore, in the case where LD2 for the combination of the pump light sources LD1 and LD2 is switched off, the output light of LD2 is the TM mode. Therefore for the combination of the pump light sources LD3 and LD4, LD4 of which the output light is the TE mode is switched off.

Figure 6:
FIG. 6 is a concept diagram for explaining a polarization state for when a TE mode and a TM mode are combined.

As a result, in both the case where four pump sources LD1 to LD4 are all on, and the case where two are on, pump light sources with different output wavelengths and also different polarization states superimposed are combined. In this state, as illustrated in the concept diagram of FIG. 6, the TE mode and the TM mode are combined, and by making each of the wavelengths different, the polarization state after combining is randomized. Consequently, the polarization states of the pump lights supplied to the transmission line 2, are equalized. Therefore it is possible to suppress fluctuations of the Raman gain existing in the polarization state of the pump light. In relation to the fluctuations of the Raman gain existing in the polarization of the pump light, this is described in detail for example in Shigeyuki Seikai and Masaki Takahashi "Polarization state and gain of lights interacting through stimulated Raman process in single-mode optical fibers", Institute of Electronics, Information and Communication Engineering paper, C-I, Vol. J72-C-I, No. 8, pp. 479-486, August 1989, and description is omitted here.

In example 2-2, for a case where the main signal band is a C-band+L-band, the polarization state of the output light is also considered in addition to the output wavelength of the respective pump light sources, and the pump light source to switch off is selected so that pump lights with different polarization states are combined and supplied to the transmission line. More specifically, here a case is considered where the polarization states (TE/TM mode) of the output light of the six pump light sources LD1 to LD6 are set for example as follows.

LD1: $\lambda_{P1}$=1430 nm, TE
LD2: $\lambda_{P2}$=1435 nm, TM
LD3: $\lambda_{P3}$=1450 nm, TM
LD4: $\lambda_{P4}$=1455 nm, TE
LD5: $\lambda_{P5}$=1485 nm, TM
LD6: $\lambda_{P6}$=1490 nm, TE In these settings, in a case where LD1 for the combination of the pump light sources LD1 and LD2 with close output wavelengths is switched off, the output light of LD1 is the TE mode, Therefore so that the combination of the remaining pump light sources LD3 and LD4 and the output light of one or both of the combination of the pump light sources LD5 and LD6 becomes the TM mode, LD3 and LD6 are switched off, or LD4 and LD5 are switched off, or LD3 and LD5 are switched. Furthermore, in a case where for the combination of the pump light sources LD1 and LD2, LD2 is switched off, the output light of LD2 is the TM mode. Therefore so that the output light of either one or both of the remaining combination of the pump light sources LD3 and LD4, and the combination of the pump light sources LD5 and LD6 becomes the TE mode, LD3 and LD6 are switched off, or LD4 and LD5 are switched off, or LD4 and LD6 are switched off. As a result, similarly to the case of example 2-1, it is possible to suppress the fluctuations of the Raman gain existing in the polarization state of the pump light.

In example 3, the wavelength deviation of the Raman gain efficiency is also considered in addition to the output wavelength and the polarization state of the respective pump light sources, and a pump light source on the side for where the output wavelength is the longest wavelength is prevented from going off as much as possible. As described above, the gain efficiency is defined as "gain/pump light total power". Regarding the wavelength deviation of the Raman gain efficiency, the signal light on the long wavelength side out of the signal lights of the respective wavelengths included in the WDM signal light, receives the Raman effect due to the signal light on the short wavelength side and is amplified, and is generated with a so-called inter-signal Raman effect as the principal factor.

Figure 7:
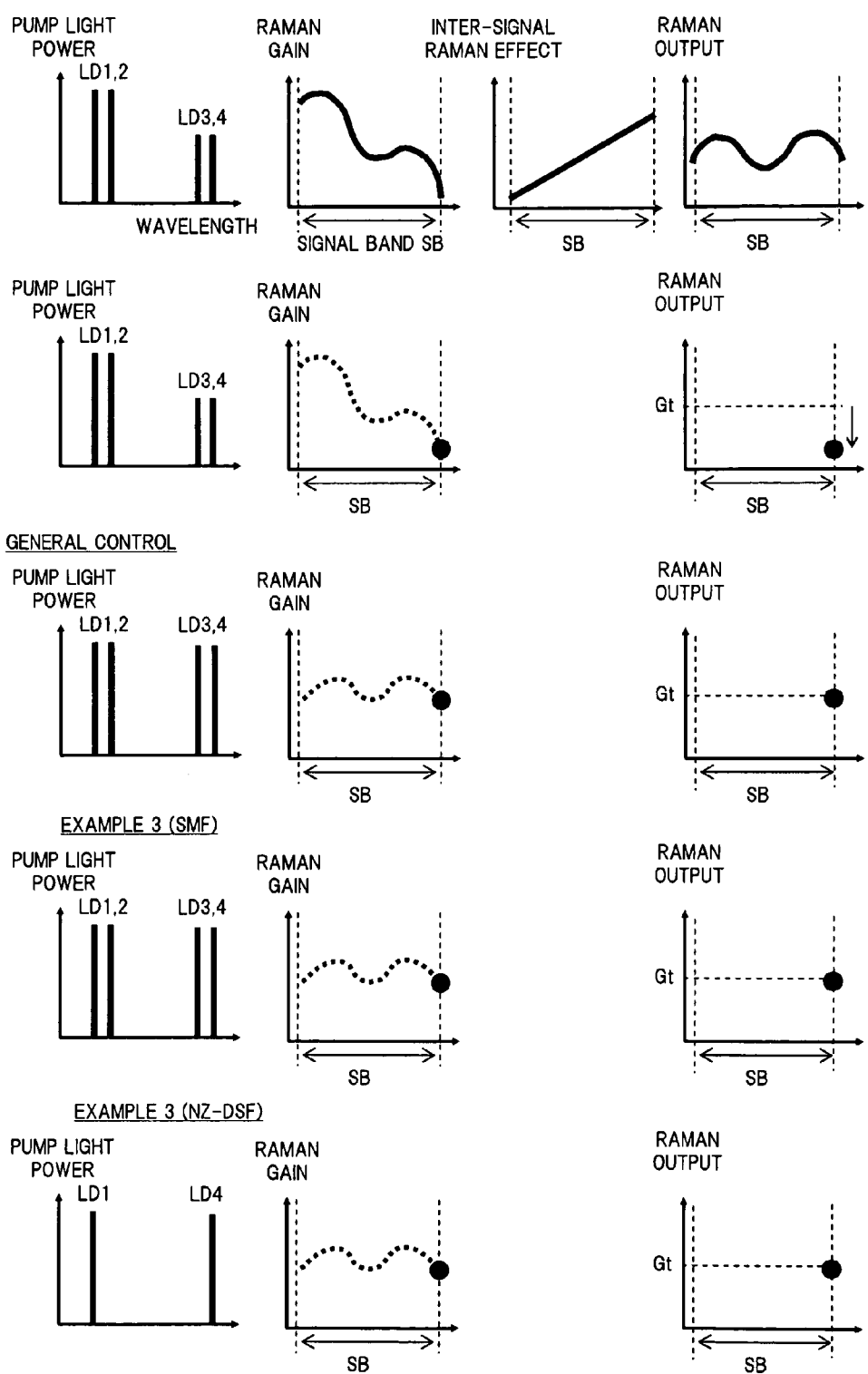
FIG. 7 is a diagram illustrating wavelength characteristics of Raman gain for where inter-signal Raman effects are considered.

FIG. 7 is a diagram illustrating wavelength characteristics of Raman gain for where inter-signal Raman effects are considered. In FIG. 7, inter-signal Raman effects are considered, and in the case where all of the four pump light sources are switched on, the power of the respective pump lights is set so that, as illustrated at the left end of the first stage, the output power of the pump light sources LD1 and LD2 on the short wavelength side become greater than the output power of the pump light sources LD3 and LD4 on the long wavelength side. At this time, regarding the wavelength characteristics of the Raman gain before receiving the inter-signal Raman effect, as illustrated on the center left side of the first stage, the Raman gain efficiency on the short wavelength side becomes relatively higher than the Raman gain efficiency on the long wavelength side. By adding and combining with this, the inter-signal Raman effect illustrated on the center right side of the first stage, the wavelength characteristics of the Raman output as illustrated on the right side of the first stage is obtained.

Moreover, in a condition where the inter-signal Raman effect cannot be expected in the case where the number of signal wavelengths is small, that is, in a condition where only a few signal lights exist on the long wavelength side of the signal band, then in order for the Raman gain with respect to these signal lights to become the target value, it is necessary to adjust the power of the pump light on the long wavelength side. In a general control, as illustrated in the second stage of FIG. 7, in order to compensate for the drop in the gain of the Raman output on the long wavelength side, due to not receiving the inter-signal Raman effect, then as illustrated in the third stage of FIG. 7, the output power of the two pump light sources LD3 and LD4 on the long wavelength side is increased.

In the above example 3, in the case of a transmission line where the gain efficiency of a SMF or the like is small, then as illustrated in the fourth stage of FIG. 7, the output power of the two pump light sources LD3 and LD4 on the long wavelength side is increased. This is similar to the case of a general control. On the other hand, in the case of a transmission line where the gain efficiency of a NZ-DSF or the like is small, then as illustrated in the fifth stage of FIG. 7, the pump light source LD4 responsible for Raman amplification on the long wavelength side of the signal band SB remains in the on state, and the pump light source LD3 and the pump light source LD2 (or LD1) on the short wavelength side are switched off, and the output power of the pump light source LD4 is increased. As a result, the gain drop on the long wavelength side due to not receiving the inter-signal Raman effect can be easily compensated for.

More specifically, in the setting of the pump light sources LD1 to LD4 in the aforementioned example 2-1 (signal band is C-band), preferably LD1 and LD3 are switched off. Furthermore, in the setting of the pump light sources LD1 to LD6 in the aforementioned example 2-2 (signal band is C-band+L-band), preferably LD1, LD3 and LD5 are switched off, or LD1, LD4 and LD5 are switched off, or LD2, LD4 and LD5 are switched off. As a result, even in the condition where the inter-signal Raman effect cannot be expected in the case where the number of signal wavelengths is small, it is possible for the Raman gain to be reliably made the target value.

Figure 18:
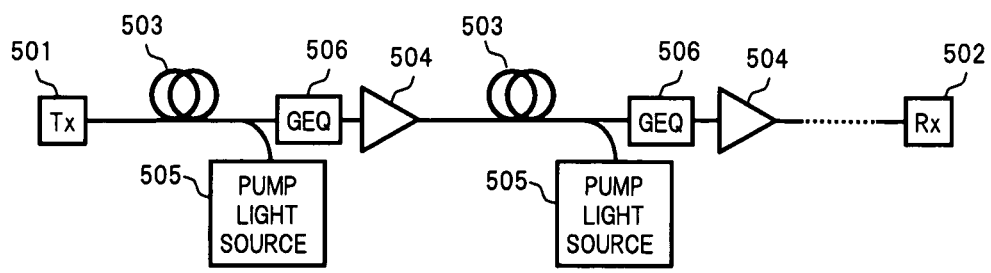
FIG. 18 is a diagram illustrating a conventional configuration for reducing wavelength deviation of output light power of a Raman amplifier, using a gain equalizer.

As described above, according to the Raman amplifier 1 of the first embodiment, even if the system requirements are variously different, gain constant control can be performed at high accuracy while using a general pump laser. Therefore the aforementioned gain equalizer or the like having a fixed loss wavelength characteristic as illustrated in FIG. 18 can be used, and wavelength deviation of the output light power of the Raman amplifier 1 can be reliably compensated. As a result, long distance transmission of WDM signal light becomes possible.

Figure 8:
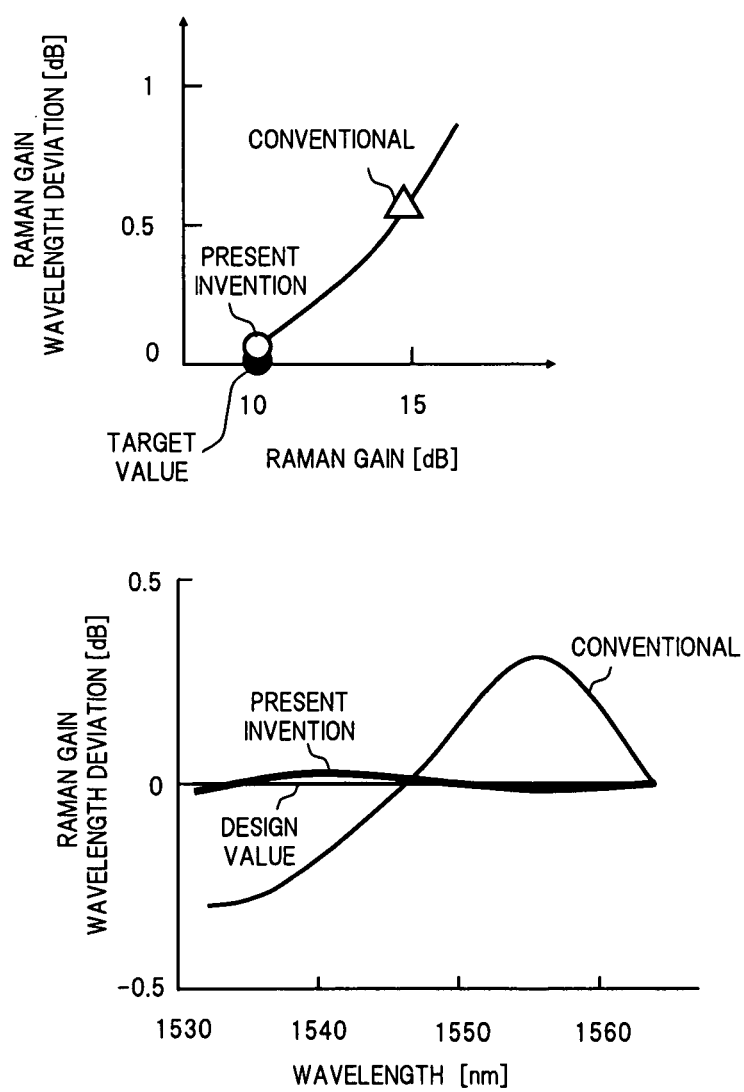
FIG. 8 is a diagram specifically illustrating an effect of decreasing wavelength deviation due to the Raman amplifier 1.

FIG. 8 is a diagram specifically illustrating an effect of decreasing the wavelength deviation due to the Raman amplifier 1. At the top of FIG. 8, the X-axis is Raman gain, and the Y-axis is Raman gain wavelength deviation (including compensation by the gain equalizer). In the case of a transmission line in which the gain efficiency for a NZ-DSF or the like is large, when all of the pump light sources are switched on as in the conventional manner, it is seen that for where a target value for the Raman gain is 10 dB, the actually obtained Raman gain becomes 15 dB. On the other hand, in the case of the Raman amplifier 1, it can be seen that by lowering the lower limit of the pump light total power, a Raman gain of 10 dB equal to the target value can be realized. Furthermore, the bottom of FIG. 8 illustrates the wavelength characteristics for Raman gain corresponding to the graph at the top. In the case where all of the pump light sources are switched on in the conventional manner, the Raman gain occurs greater than the target value. Therefore the Raman gain wavelength deviation including compensation by the gain equalizer also increases, and it is seen that for where the design value for the wavelength deviation is 0 dB, a wavelength deviation of 0.6 dB actually occurs. On the other hand, in the case of the Raman amplifier 1, since the Raman gain can be controlled to a value equal to the target value, it is seen that a very small value of 0.05 dB which is substantially equal to the design value can also be realized for the Raman gain wavelength deviation. The above wavelength deviation accumulates due to multi-span transmission. Therefore, for example assuming the case of a six span transmission, compared to the conventional case, in the Raman amplifier 1 it is possible to reduce the accumulation of the wavelength deviation equivalent to (0.6−0.05) dB×6=3.3 dB. Consequently, in a WDM optical transmission system to which the Raman amplifier 1 is applied, WDM signal light can be transmitted across even greater spans, so that it is possible to have a longer distance for the system.

Figure 9:
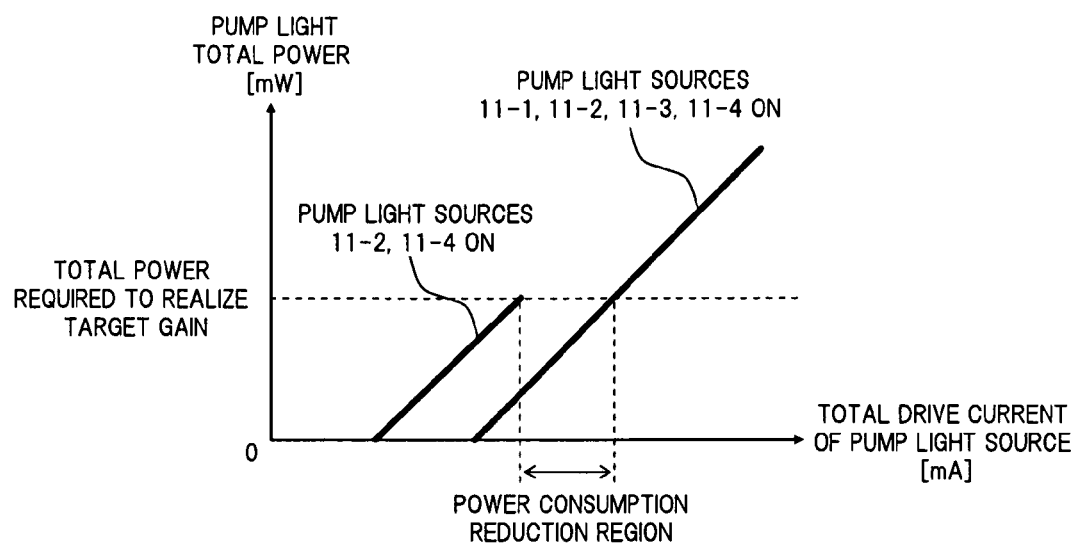
FIG. 9 is a diagram for explaining an effect of decreasing power consumption in the first embodiment.

In addition to the above effect, in the case where the Raman amplifier 1 is connected to a transmission line 2 with high gain efficiency, since the number of pump light sources for driving is decreased, there is also the effect that power consumption of the Raman amplifier 1 can be reduced. FIG. 9 specifically illustrates the effect of reducing the power consumption, wherein the X-axis shows the total drive current of the pump light source, and the Y-axis shows the total power of the pump light. Here also, as with the aforementioned example, a case where all of the four pump light sources 11-1 to 11-4 are switched on, and a case where two of the pump light sources 11-2 and 11-4 are switched on are compared. If in each case the transmission lines are common, the total power of the pump lights required to realize the target gain are the same. However for the respective pump light sources to obtain a light emitting state it is necessary to provide a threshold value current to each. Therefore the total drive current can be reduced by having only two pump light sources on rather than four on, and an effect of reducing the power consumption corresponding to the difference in this total drive current is obtained.

In the above first embodiment, an example is described where at the time of start up of the Raman amplifier 1, in a case where all of the pump light sources are driven at a minimum set value for the stable region, and the computation value for the Raman gain is greater than the target value, at least one pump light source is switched on. However it is also possible to apply a control sequence opposite to this. More specifically, at the beginning of start up of the Raman amplifier 1, in a state with at least one pump source is switched off, the pump light power is controlled so that the Raman gain becomes the target value. At this time, in a case where even if the drive state of the switched on pump light source is increased to the maximum set value for the stable region, the computation value for the Raman gain is smaller than the target value, all of the pump light sources are switched to on to perform control of the pump light power.

However, considering that with a greater number of pump light sources switched on, the wavelength difference of the Raman gain can be reduced (refer to FIG. 5), and the adjustment range for the pump light total power can also be widened (refer to FIG. 6), then in a case where the above described opposite control sequence is applied, in a state where the number of pump light sources that are on is few, the control for making the Raman gain become the target value is performed preferentially. Therefore in the operation of the Raman amplifier 1, the control sequence where all of the pump light sources are switched on at the beginning of start up is preferable.

Next is a description of a WDM optical communication system that uses the above described Raman amplifier 1 of the first embodiment.

Figure 10:
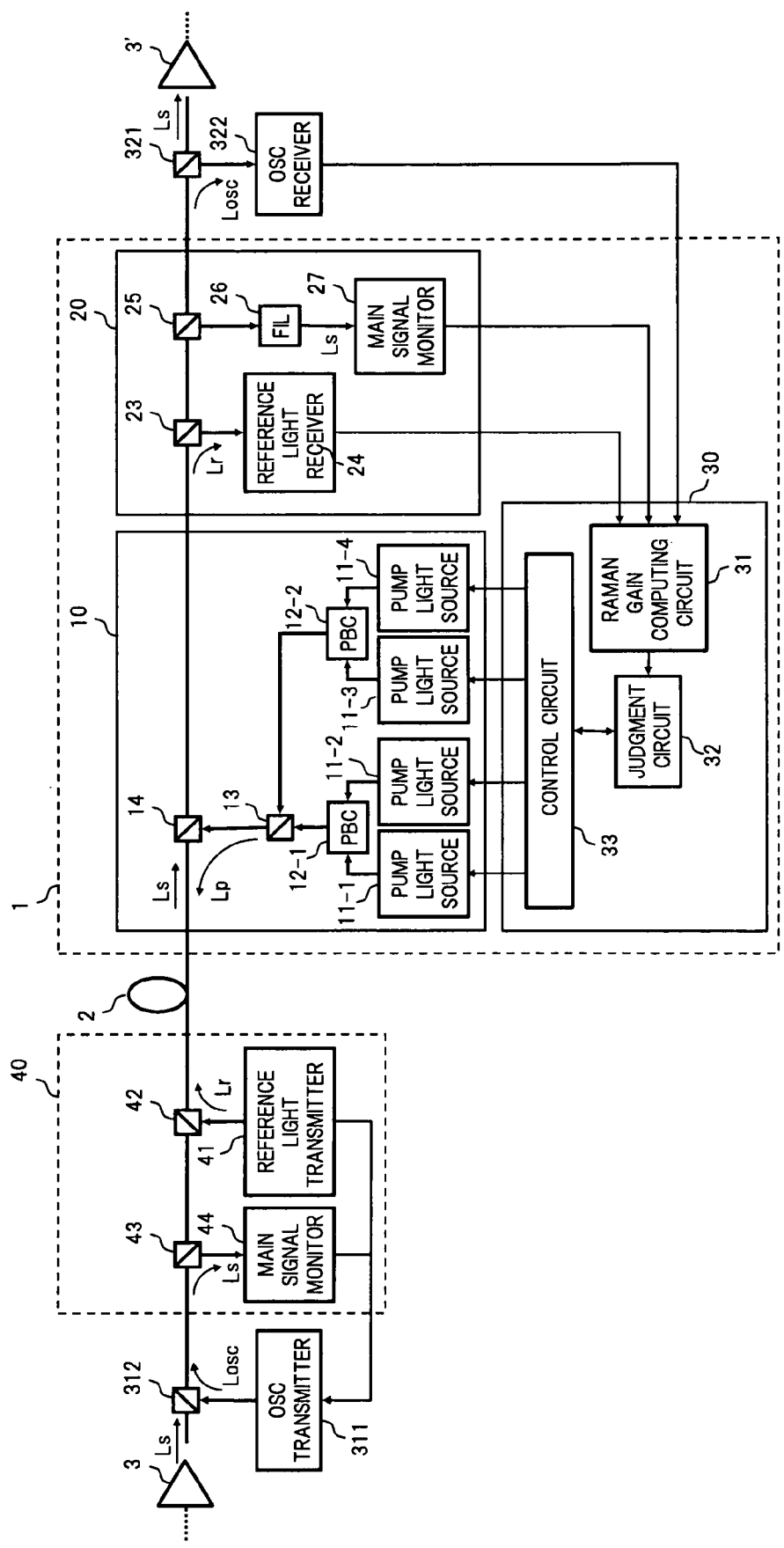
FIG. 10 is a block diagram illustrating a configuration of one repeating section in a WDM optical communication system that uses a Raman amplifier of the first embodiment.

FIG. 10 is a block diagram illustrating a configuration example of one repeating section in the WDM optical communication system.

In FIG. 10, the optical repeating node located on the upstream side (the left side in the figure) of the transmission line 2 is provided with; a WDM optical amplifier 3 that uses an EDFA or the like, and a transmission side optical circuit section 40 that is added as a component associated with the aforementioned Raman amplifier 1 illustrated in FIG. 1. Furthermore, the optical repeating node located on the downstream side (the right side in the figure) of the transmission line 2 is provided with; the aforementioned Raman amplifier 1 illustrated in FIG. 1, and a WDM optical amplifier 3' that uses an EDFA or the like.

The transmission side optical circuit section 40 has for example; a reference light transmitter 41, a multiplexer 42, a branching device 43, and a main signal monitor 44.

The reference light transmitter 41 generates light of a required power in which the wavelength is set to outside the wavelength band of the main signal light (WDM signal light) Ls, as gain reference light Lr for detecting the Raman gain in the transmission line 2, and provides the gain reference light Lr from the transmission end side to the transmission line via the multiplexer 42. Corresponding to the reference light transmitter 41, the monitor section 20 inside the Raman amplifier 1 on the downstream side, is provided with a branching filter 23 and a reference light receiver 24 for receiving the gain reference light Lr from the upstream side. The reference light receiver 24 receives the gain reference light Lr taken out by the branching filter 23, and detects the power, and outputs the detection result to the Raman gain computing circuit 31. Regarding the technique for performing computation and the like of the Raman gain using the gain reference light Lr as described above, this is disclosed for example in Japanese Laid-open Patent Publication Nos. 2004-193640 and 2008-182679, and in Japanese Patent Application Nos. 2008-024231 and 2008-024364 of the applicant. This technique can also be utilized in the present invention.

The branching device 43 takes out a part of the main signal light Ls that has been amplified by the WDM optical amplifier 3 and sent to the transmission line 2, and outputs this to the main signal monitor 44. The main signal monitor 44 uses the light taken out by the branching device 43, and detects the power of the main signal light Ls that is sent to the transmission line 2, and outputs the detection result to an OSC transmitter 311. The OSC transmitter 311 generates a general optical supervisory channel (OSC) that is transmitted between the respective optical repeating nodes on the system, and sends this to the transmission line 2 via a multiplexer 312. Here wavelength information for the main signal light Ls, together with information that includes the transmission power of the main signal light Ls detected by the main signal monitor 44, and the transmission power of the gain reference light Lr output from the reference light transmitter 41, are carried on the OSC and transmitted to the optical repeating node on the downstream side. Inside the optical repeating node on the downstream side there is provided a branching filter 321 that takes out the OSC from the upstream side before the WDM optical amplifier 3', and the OSC taken out by the branching filter 321 is received and processed by an OSC receiver 322. As a result, the transmission power and the wavelength information of the main signal light Ls, and information including the transmission power of the gain reference light Lr are taken out, and this information is transmitted to the Raman gain computing circuit 31.

The monitor section 20 inside the downstream side Raman amplifier 1, in addition to the aforementioned branching filter 23 and the reference light receiver 24, is provided with a branching device 25, an optical filter (FIL) 26, and a main signal monitor 27. The branching device 25 branches a part of the Raman amplified main signal light Ls propagated on the transmission line 2, and the light propagated in the same direction as the main signal light Ls (the noise light or OSC or the like generated by Raman amplification) and outputs this to the optical filter 26. The optical filter 26 removes light other than the main signal light Ls included in the light from the branching device 25. The main signal monitor 27 uses the light that has passed through the optical filter 26, and detects that reception power of the main signal light Ls that has been Raman amplified by the transmission line 2, and outputs the detection result to the Raman gain computing circuit 31.

In the WDM optical communication system of the above configuration, in the Raman amplifier 1 provided in the optical repeating node located on the downstream side of the respective repeating sections, drive control is performed on the plurality of pump light sources corresponding to the system requirements of various types of transmission lines 2 such as described in the aforementioned first embodiment. In the control in the configuration example of FIG. 10, the computation processing for the Raman gain that is executed by the Raman gain computing circuit 31 is performed using the information respectively transmitted from the reference light receiver 24, the main signal monitor 27, and the OSC receiver 322, to the Raman gain computing circuit 31, and the computation result is transmitted to the judgment circuit 32.

According to the above WDM optical communication system, the gain constant control of the Raman amplifier 1 at the respective node sections, is performed at a high accuracy, flexibly corresponding also to a variety of system requirements. Therefore accumulation of the wavelength deviations of the WDM signal light attributable to the changes in the wavelength characteristics of the Raman gain can be kept to a minimum. Consequently repeating transmission of WDM signal light over long distances while maintaining good quality becomes possible.

In the configuration example of the WDM optical communication system, the information related to the types of transmission lines uses OSC and the like, but it is also possible to notify this information from a system management section (not illustrated in the figure) to the control section 30 of the Raman amplifier 1. In the case where such a function for notifying the various types of transmission lines is provided in the WDM optical communication system, then instead of driving the respective pump light sources at the beginning of start up of the Raman amplifier 1, and performing a comparison judgment between the computation value obtained by computing the Raman gain in the transmission line 2, and the target value, information related to the type of transmission line notified by the OSC or the like may be used, and the on/off state of the respective pump light sources set corresponding to the type of transmission line. If this is done, then shortening of the time required for control at the time of start up becomes possible. Furthermore, the judgment result of comparing the computation value for Raman gain with the target value, and information related to the type of transmission line are used together, to perform on/off setting of the respective pump light sources, and it is also possible to achieve an improvement in the control accuracy.

Next is a description of a second embodiment of a Raman amplifier.

Figure 11:
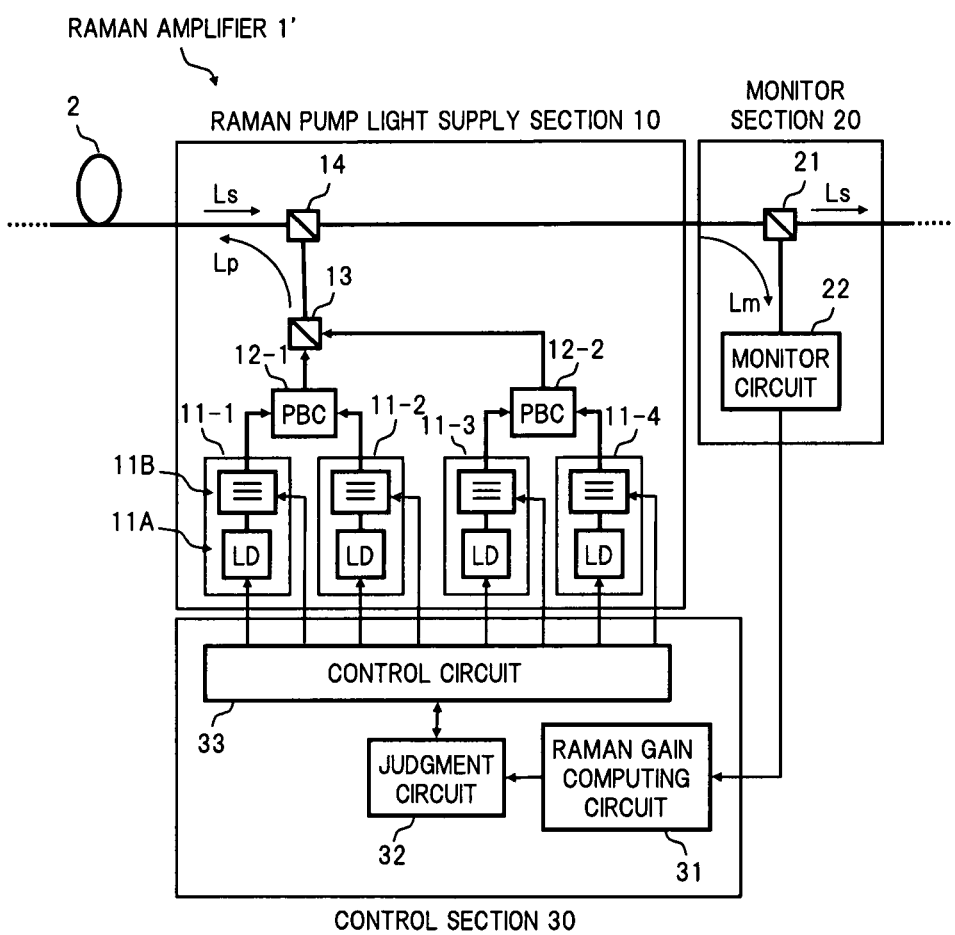
FIG. 11 is block diagram illustrating a configuration of a second embodiment of a Raman amplifier according to the invention.

FIG. 11 is a block diagram illustrating a configuration of a Raman amplifier according to the second embodiment.

In FIG. 11, a Raman amplifier 1' of this embodiment, is such that in the configuration of the first embodiment illustrated in FIG. 1, the oscillation wavelengths of the respective pump light sources 11-1 to 11-4 are changed. In the Raman amplifier 1', in the case where, similar to the case of the first embodiment, part of the four pump light sources 11-1 to 11-4 is switched off, control is performed to fine adjust the oscillation wavelength of the pump light source that is switched on, to shift this to the oscillation wavelength side of the pump light source that is switched off.

More specifically, the construction is such that the pump light sources 11-1 to 11-4 are respectively furnished with a laser element 11A and a wavelength fixator 11B, and by controlling the temperature of the laser element 11A or the wavelength fixator 11B, or by controlling the stress applied to the wavelength fixator 11B, it is possible to shift (fine tune) the wavelength of the output pump light. The on/off control of the respective pump light sources 11-1 to 11-4, and the shift control of the oscillation wavelengths is performed in accordance with a control signal output from a control circuit 33 to the respective pump light sources 11-1 to 11-4.

Figure 12:
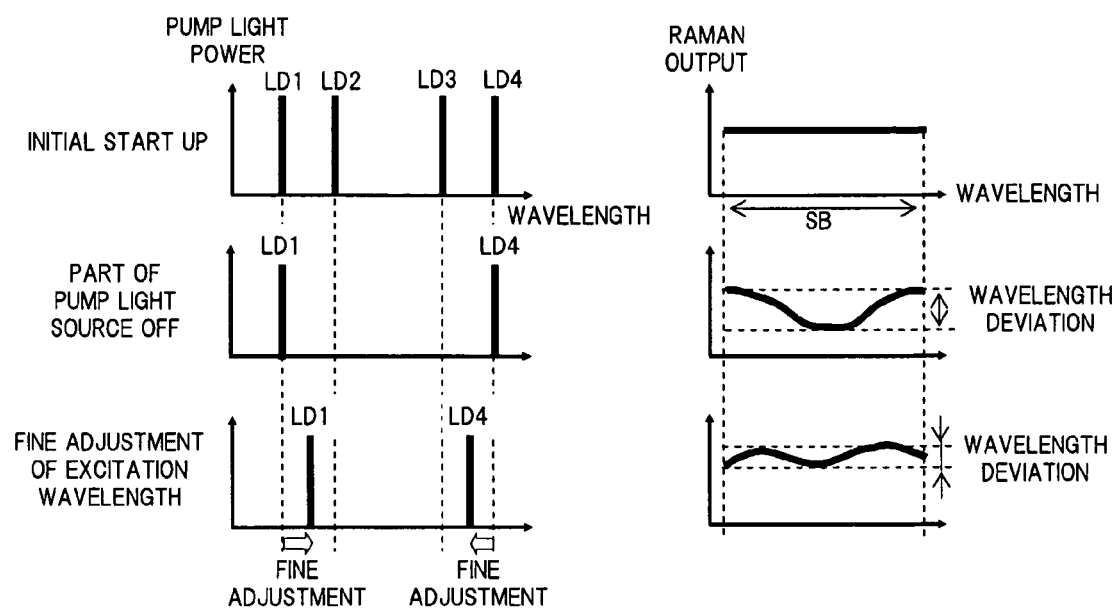
FIG. 12 is a block diagram illustrating an example of pumping wavelength shift control, in the second embodiment.

In the Raman amplifier 1' of the above configuration, in a case where a transmission line 2 with a large gain efficiency is connected using the control sequence at the time of starting similar to the case of the first embodiment, at least one pump light source of the four pump light sources 11-1 to 11-4 is switched off. Here, a description is given assuming the case where for example as illustrated at the center of FIG. 12, the pump light source 11-2 (LD2) and the pump light source 11-3 (LD3) are switched off, and the pump light source 11-1 (LD1) and the pump light source 11-4 (LD4) are switched on. In this state, due to the pump light sources LD2 and LD3 being switched off, the Raman gain wavelength dependency for when all of the pump light sources 11-1 to 11-4 are switched on changes slightly. Therefore, the compensation for the wavelength deviation due to the gain equalizer is shifted from that assumed at the time of design, thereby producing a wavelength deviation in the signal light power, though only very slight. In the center right side of FIG. 12, an aspect where the level near both ends of the signal band SB is slightly higher than the level near the center is illustrated emphasized.

The above wavelength deviation is accumulated by being transmitted by the abovementioned greater span, so that there is a possibility that the transmission characteristics of the WDM signal light are deteriorated. Therefore, in the Raman amplifier 1' of this embodiment, as illustrated at the bottom left side of FIG. 12, the oscillation wavelength of the pump light source LD1 that is switched on, is finely adjusted to the long wavelength side by shifting to the oscillation wavelength side of the pump light source LD2 that is switched off. Furthermore, at the same time as this, the oscillation wavelength of the pump light source LD4 that is switched on, is finely adjusted to the short wavelength side by shifting to the oscillation wavelength side of the pump light source LD3 that is switched off. The shift amount of the oscillation wavelengths of the respective pump light sources LD1 and LD4 can be set beforehand corresponding to the combinations of on/off of the respective pump light sources. Furthermore, the wavelength characteristics of the Raman gain may be monitored by the monitor circuit 22, and the shift amount of the oscillation wavelength of the respective pump light sources LD1 and LD4 may be feedback controlled so that the monitor result approaches the design characteristics. Due to the shift control of the oscillation wavelength of the respective pump light sources LD1 and LD4 as described above, then as illustrated at the bottom right side of FIG. 12, the wavelength deviation of the signal light power after compensation by the gain equalizer is kept even smaller.

In the above second embodiment, the description is given illustrating the example where the LD2 and LD3 of the four pump light sources are switched off. However, it is possible to apply the above shift control for the pumping wavelength also for the combination of the pump light sources corresponding to the abovementioned selection method (examples 1 to 3) of the pump light sources in the first embodiment.

Next is a description of a third embodiment of a Raman amplifier.

Figure 13:
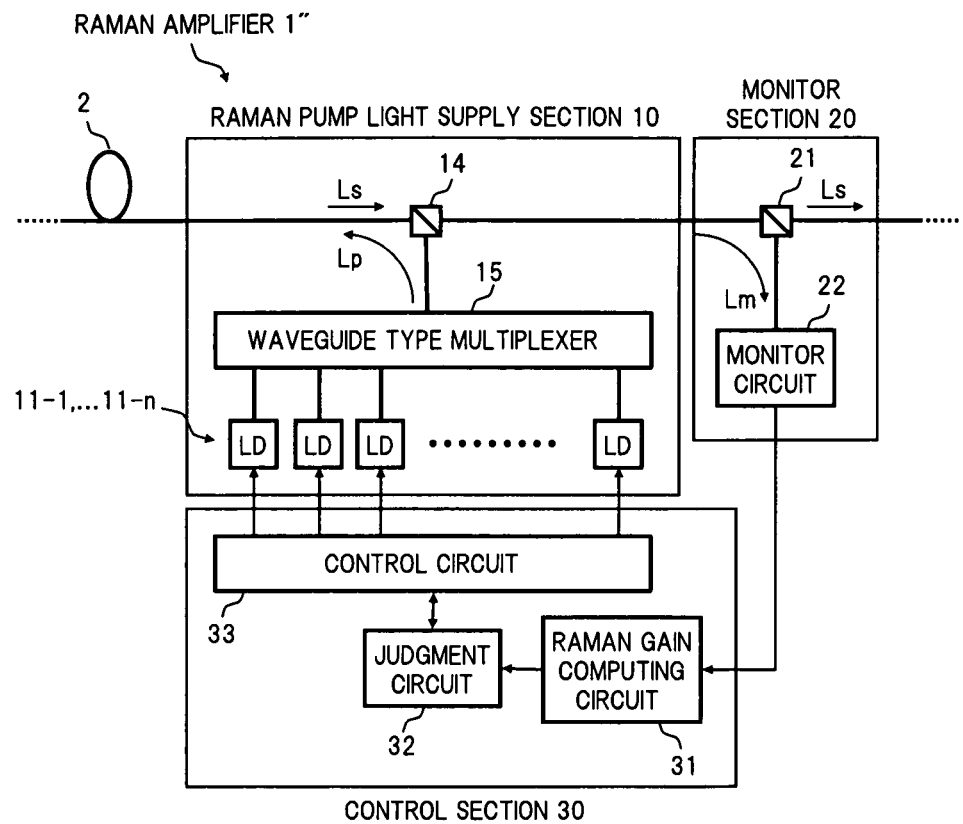
FIG. 13 is a block diagram illustrating a configuration of a third embodiment of a Raman amplifier according to the invention.

FIG. 13 is a block diagram illustrating a configuration of a Raman amplifier according to the third embodiment.

In FIG. 13, a Raman amplifier 1" of this embodiment, is such that for example the oscillation wavelengths of n pump light sources 11-1 to 11-n are arranged at approximately equal intervals, and the pump light output from each of the respective pump light sources 11-1 to 11-n is combined into one using a waveguide type multiplexer 15. In the waveguide type multiplexer 15, the combined pump light Lp, similarly to the case of the first and second embodiments, is supplied to the transmission line 2 via a signal light/pump light combiner 14.

The wavelength arrangement of the plurality of pump lights is generally limited to the performance and characteristics of the multiplexer. In the case of the abovementioned first and second embodiments, a general pumping configuration is employed where the pump light band is divided into two blocks, one on the short wavelength side and one the long wavelength side, in accordance with the performance and characteristics of the pump light combiner 13, and the total of four pump light sources are combined by applying the polarization combiner to each of the respective blocks. In this general pumping configuration, the number of wavelengths of the pump light is comparatively small, and the interval between the pumping wavelength on the short wavelength side and the pumping wavelength on the long wavelength side is somewhat wide. Therefore Raman gain wavelength characteristics corresponding to the wavelength arrangement of the pump light are generated. In order to suppress these Raman gain wavelength characteristics, in the Raman amplifier 1", for example by employing a waveguide type multiplexer 15 that uses a Mach-Zehnder interferometer type optical waveguide, the number of pump light sources is increased, and the wavelength arrangement of the pump lights is made substantially equal intervals. As a result, the Raman gain in the case where the respective pump light sources are driven by a predetermined output power becomes one having a substantially flat wavelength characteristic. Therefore, the gain equalizer that performs compensation of the Raman gain wavelength characteristics becomes basically unnecessary.

Figure 14:
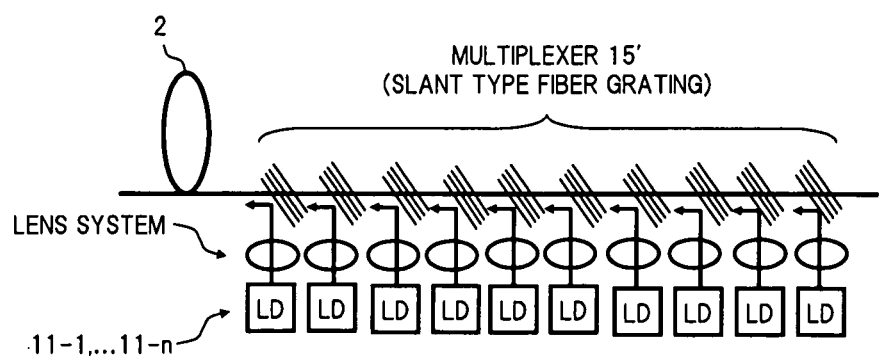
FIG. 14 is a diagram illustrating another configuration example of a multiplexer, related to the third embodiment.

Here, a configuration example where the respective pump light sources are combined using the waveguide type multiplexer 15 is illustrated. However instead of the waveguide type multiplexer 15 and the signal light/pump light combiner 14, it is also possible to employ a multiplexer 15' that uses a slant type fiber grating as illustrated for example in FIG. 14. In this multiplexer 15', slant type fiber gratings corresponding to each of the n pump light sources 11-1 to 11-n are formed at predetermined positions on the optical path connected to the transmission line 2, and by irradiating the pump light output from the respective pump light sources onto the corresponding slant type fiber gratings via a lens system, the respective pump lights are guided within the optical path and supplied to the transmission line 2.

Figure 15:
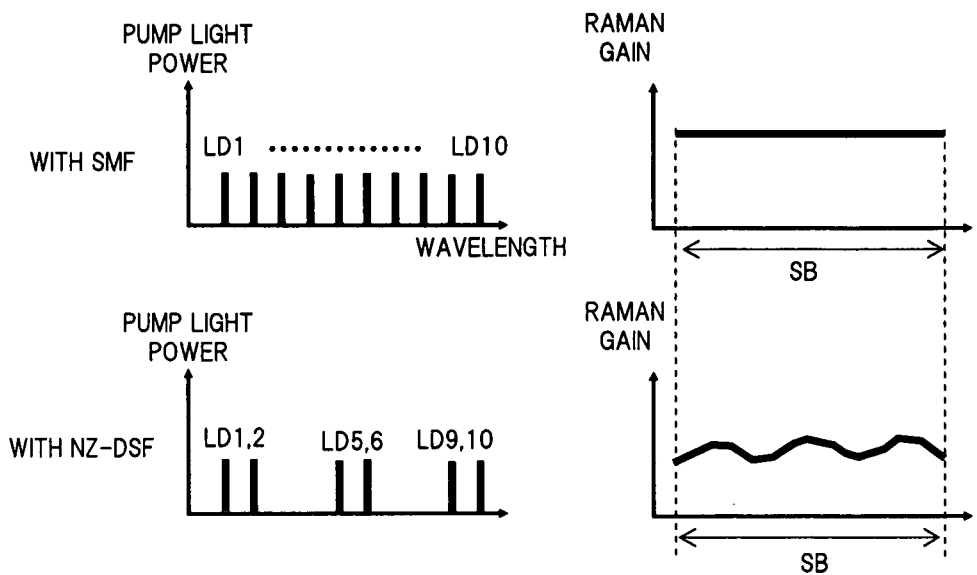
FIG. 15 is a diagram illustrating an example of pump light source on/off control in the third embodiment.

Also in the Raman amplifier 1" of the above described configuration, in a case where a transmission line 2 with a large gain efficiency is connected using the control sequence at the time of starting similar to the case of the first embodiment, at least one pump light source of the n pump light sources 11-1 to 11-n is switched off. Here as illustrated for example in FIG. 15, assuming the case where ten pump light sources (LD1 to LD10) are provided, in the case where a transmission line of a SMF or the like for which the gain efficiency is small is connected (top of FIG. 15), by switching on all of the pump light sources, and uniformly controlling the output power of the respective pump light sources so that the Raman gain becomes the target value, a Raman gain having a substantially flat wavelength characteristic across the signal band SB is realized.

On the other hand, in the case where a transmission line of a NZ-DSF or the like for which the gain efficiency is large is connected (bottom of FIG. 15), for example the third and fourth pump light sources LD3 and LD4 from the short wavelength side, and the seventh and eighth pump light sources LD7 and LD8 are switched off, and the output power of the remaining pump light sources LD1, LD2, LD5, LD6, LD9, and LD10 that are switched on is controlled uniformly so that the Raman gain becomes the target value. As a result, compared to the case where all of the pump light sources are switched on, Raman gain having the occurrence of a slight wavelength deviation, but a sufficiently flat wavelength characteristic across the signal ban SB is realized.

In the above example, LD3, LD4, LD7, and LD8 are selected as the pump light sources that are switched off. However which one of the ten pump light sources to select to switch off can be appropriately determined by considering the total power of the pump light supplied to the transmission line 2 and the Raman gain wavelength characteristics.

Furthermore, in the Raman amplifier 1", even if some pump light sources are switched off, Raman gain having a comparatively flat wavelength characteristic is obtained. Therefore in the start up initial stage, rather than driving all of the pump light sources at the lower limit of the stable region, at least one previously determined pump light source may be switched off, and the remaining pump light sources driven within the stable region to perform start up. In this case, the number of pump light sources to be switched off is increased if the calculated value is greater than the target value of the Raman gain, and on the other hand, the pump light sources that have been switched off are switched on if the calculated value is smaller, to thereby achieve the Raman gain of the target value.

Furthermore, after performing the on/off control of the pump light sources, by uniformly controlling the output power of the pump light source that is switched on, the Raman gain of the target value is realized. However, for example in the case where the WDM signal light input to the Raman amplifier 1" includes signal light with different bit rates, the output power of the pump light source responsible for Raman amplification of the band in which signal lights of relatively high speed bit rates are arranged may be made greater than the output power of the pump light source responsible for Raman amplification of the band in which signal lights of the relatively low speed bit rates are arranged, so that the Raman gain for the higher speed signal light is increased to improve the OSNR.

More specifically, for example in a case where WDM signal light in which 10 Gb/s signal light and 40 Gb/s signal light coexist, is input to the Raman amplifier 1", in order to realize equivalent transmission characteristics for the respective signal lights, it is necessary to improve the OSNR of the 40 Gb/s signal light by four times (6 dB) compared to the OSNR of the 10 Gb/s signal light.

Figure 16:
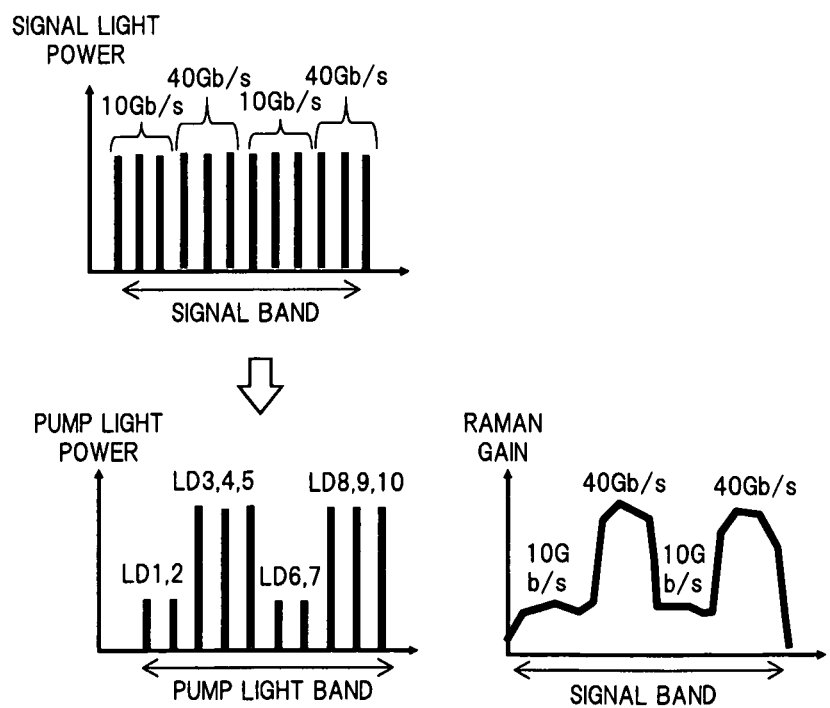
FIG. 16 is a diagram illustrating an example of a case where pump light power control is performed corresponding to signal light bit rate, related to the third embodiment.
Figure 17:
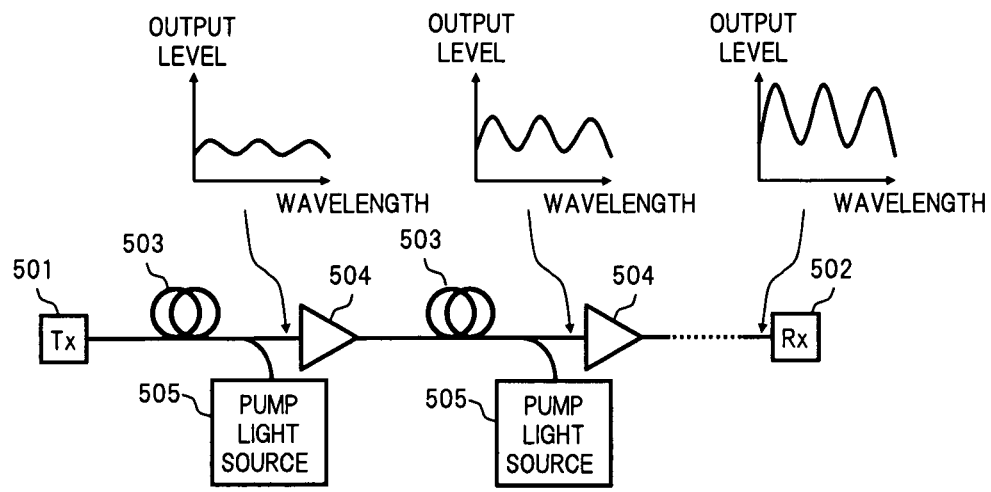
FIG. 17 is a diagram illustrating an example of a WDM optical communication system that uses a general distributed Raman amplifier.

Therefore, assuming WDM signal light in which 10 Gb/s signal light and 40 Gb/s signal light coexist in the wavelength arrangement as illustrated for example at the top left of FIG. 16, the case is considered where all of the ten pump light sources LD1 through LD10 are switched on and Raman amplification is performed on the WDM signal light. In this case the pump light sources mainly responsible for Raman amplification of the signal light of 10 Gb/s, correspond to LD1, LD2, and LD6 and LD7, and the pump light sources mainly responsible for Raman amplification of the signal light of 40 Gb/s, correspond to LD3, LD4, LD5, and LD8, LD9, LD10. Information related to the bit rate of the respective signal lights can be acquired by using the aforementioned OSC.

Therefore, the drive state for each of the pump light sources is controlled so that, as illustrated at the bottom left of FIG. 16, the respective output powers of the pump light sources LD3 to LD5, and LD8 to LD10 become large compared to the respective output powers of the pump light sources LD1, LD2, and LD6, LD7. As a result, as illustrated at the bottom right of FIG. 16, the Raman gain for the region in which the 40 Gb/s signal light is arranged within the signal band is greater than for the other regions, and the OSNR of the 40 Gb/s signal light included in the WDM signal light after Raman amplification is relatively improved compared to the OSNR of the 10 Gb/s signal light. Therefore, WDM signal light in which signal lights of different bit rates coexist can be transmitted across a longer distance.

The control of the pump light power corresponding to the bit rate of the signal light as described above is effective not only for the third embodiment where the pumping wavelengths are arranged at substantially equal intervals, but also for the first and second embodiments in which a general pumping configuration is employed.

Moreover, in the description of the first to third embodiments of the Raman amplifier described above, at the time of start up of the Raman amplifier, the control sequence as illustrated in FIG. 2 is executed, and the drive states for the plurality of pump light sources are optimized. However, it is also possible to perform a similar optimization during operation of the Raman amplifier. More specifically, in the gain constant control executed during operation of the Raman amplifier, even if the drive states of the respective pump light sources that are switched on are at the maximum set value of the adjustment range, in the case where the Raman gain becomes less than the target value, control may be performed to switch at least one of the pump light sources that are switched off to on, and gradually increase the output power, so as to realize the target value Raman gain.

Moreover, converse to this, in the gain constant control executed during operation of the Raman amplifier, even if the drive states of the respective pump light sources that are switched on are at the minimum set value of the adjustment range, in the case where the Raman gain becomes greater than the target value, control may be performed to switch at least one of the pump light sources that are switched on to off, and gradually increase the output power of the remaining pump light sources that are switched on, so as to realize the target value Raman gain. By appropriately controlling the above on/off switching of the pump light sources during operation, then even in the case where the gain efficiency of the transmission line changes transiently during operation of a communication service, it is possible to rapidly correspond to this change.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A Raman amplifier that supplies pump light to a transmission line, and amplifies wavelengths multiplexed signal light that propagates on the transmission line, the Raman amplifier comprising:
a Raman pump light supply section configured to have a plurality of pump light sources with different wavelengths, and to supply pump light output from the respective pump light sources to the transmission line;
a monitor section configured to monitor the light propagated on the transmission line, to acquire information necessary for judging Raman gain in the transmission line; and
a control section configured, when information related to a type of the transmission line is notified from outside of the Raman amplifier, to specify a pump light source to be switched on and a pump light source to be switched off, from among the plurality of pump light sources, corresponding to the type of the transmission line, and to control the drive state of the pump light source that is specified to be switched on.

2. A Raman amplifier according to claim 1, wherein the control section is configured, when at least one pump light source out of the plurality of pump light sources is switched off, to switch off one of two pump light sources for which a difference in output wavelengths is smallest from among the plurality of pump light sources, and to switch on the other pump light source.

3. A Raman amplifier according to claim 2, wherein the control section is configured, when at least one pump light source out of the plurality of pump light sources is switched off, to switch on one by one at least the pump light sources for which polarization states of the output lights are different.

4. A Raman amplifier according to claim 2, wherein the control section is configured, when at least one pump light source out of the plurality of pump light sources is switched off, to make a pump light source on a side where the output wavelength is the longest wavelength, be included in the pump light sources that are switched on.

5. A Raman amplifier according to claim 1, wherein the control section is configured to control the drive states of the respective pump light sources within the stable region, so that a power ratio of the respective pump lights output from the pump light sources that are specified to be switched on, becomes a predetermined value that is designed beforehand.

6. A Raman amplifier according to claim 1, wherein the control section is configured, when the Raman gain in the transmission line cannot be made the target value even if the drive state of the pump light source that is specified to be switched on is controlled within the stable region, to judge an abnormality in the transmission line and emit an alarm, and to notify the computation value of the Raman gain for at the time when the abnormality is judged, to outside of the Raman amplifier.

7. A Raman amplifier according to claim 1, wherein the control section is configured, in the case where during operation after start up, the Raman gain in the transmission line becomes less than a previously set target value even though the respective pump light sources that are switched on are driven at the upper limit of the stable region, to switch on at least one of the pump light sources that is switched off, and to control the drive state so that the output power is gradually increased, to make the Raman gain in the transmission line become the target value.

8. A Raman amplifier according to claim 1, wherein the control section is configured, in the case where during operation after start up, the Raman gain in the transmission line becomes greater than a previously set target value even though the respective pump light sources that are switched on are driven at the lower limit of the stable region, to switch off at least one of the pump light sources that is switched on, and to control the drive state so that the output power of the remaining pump light sources that are switched on, is gradually increased, to make the Raman gain in the transmission line become the target value.

9. A Raman amplifier according to claim 1, wherein the control section is configured, when at least one pump light source out of the plurality of pump light sources is switched off, to shift a wave length of a pump light source with a wavelength adjacent to the pump light source to be switch off, among the pump light sources to be switched on, to a side of wavelength of the pump light source to be switched off.

10. A Raman amplifier according to claim 1, wherein in the Raman pump light supply section, a wavelength arrangement of pump lights output from the plurality of pump light sources is substantially equal intervals.

11. A Raman amplifier according to claim 1, wherein the control section is configured, when signal lights with different bit rates are mixed in the wavelength multiplexed signal light, to control the output power of the pump light source that is specified to be switched on, corresponding to the wavelength and the bit rate of the signal light.

12. A method of controlling a Raman amplifier that supplies pump light to a transmission line, and amplifies wavelengths multiplexed signal light that propagates on the transmission line, the method comprising:
configuring a Raman pump light supply section to have a plurality of pump light sources with different wavelengths, and to supply pump light output from the respective pump light sources to the transmission line;
configuring the Raman amplifier to:
monitor the light propagated on the transmission line, to acquire information necessary for judging Raman gain in the transmission line; and
when information related to a type of the transmission line is notified from outside of the Raman amplifier, specify a pump light source to be switched on and a pump light source to be switched off, from among the plurality of pump light sources, corresponding to the type of the transmission line, and to control the drive state of the pump light source that is specified to be switched on.

13. A method according to claim 12, wherein the Raman amplifier is further configured, in the case where during operation after start up, the Raman gain in the transmission line becomes less than a previously set target value even though the respective pump light sources that are switched on are driven at the upper limit of the stable region, to switch on at least one of the pump light sources that is switched off, and to control the drive state so that the output power is gradually increased, to make the Raman gain in the transmission line become the target value.

14. A Raman amplifier according to claim 12, wherein the Raman amplifier is further configured, in the case where during operation after start up, the Raman gain in the transmission line becomes greater than a previously set target value even though the respective pump light sources that are switched on are driven at the lower limit of the stable region, to switch off at least one of the pump light sources that is switched on, and to control the drive state so that the output power of the remaining pump light sources that are switched on, is gradually increased, to make the Raman gain in the transmission line become the target value.

* * * * *